United States Patent
Evans

(10) Patent No.: US 10,684,866 B2
(45) Date of Patent: *Jun. 16, 2020

(54) CONTEXT SENSITIVE FRAMEWORK FOR PROVIDING DATA FROM RELEVANT APPLICATIONS

(71) Applicant: Amazon Technologies, Inc., Seattle, WA (US)

(72) Inventor: Ethan Zane Evans, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/623,903

(22) Filed: Feb. 17, 2015

(65) Prior Publication Data

US 2016/0239534 A1 Aug. 18, 2016

(51) Int. Cl.
  *G06F 16/00* (2019.01)
  *G06F 9/445* (2018.01)
  *H04L 29/08* (2006.01)
  *G06F 9/451* (2018.01)

(52) U.S. Cl.
  CPC .............. *G06F 9/445* (2013.01); *H04L 67/22* (2013.01); *H04L 67/306* (2013.01); *G06F 9/451* (2018.02)

(58) Field of Classification Search
  CPC ................. G06F 8/60; G06F 8/61; G06F 8/62
  USPC .................................................. 707/736, 803
  See application file for complete search history.

(56) References Cited

U.S. PATENT DOCUMENTS

| 8,938,394 | B1* | 1/2015 | Faaborg | G06F 3/167 704/270 |
| 9,489,247 | B2 | 11/2016 | Evans | |
| 9,740,467 | B2 | 8/2017 | Evans | |
| 10,261,672 | B1* | 4/2019 | Dolbakian | G06F 3/04817 |

(Continued)

FOREIGN PATENT DOCUMENTS

| CN | 101753598 A | 6/2010 |
| CN | 102968427 A | 3/2013 |

(Continued)

OTHER PUBLICATIONS

Office action for U.S. Appl. No. 14/623,893 dated Oct. 2, 2015, Evans, "Context Sensitive Framework for Providing Data From Relevant Applications", 18 pages.

(Continued)

*Primary Examiner* — Hanh B Thai
(74) *Attorney, Agent, or Firm* — BakerHostetler

(57) ABSTRACT

Functionality is disclosed herein for using a context sensitive framework to identify relevant applications to a current context and to provide data received from the relevant applications to a user. Instead of a user having to manually locate and launch an application, relevant applications determined by a contextual service may provide data in response to receiving the context data. The applications that are identified as relevant to the context determine the application data to provide to the contextual service. The contextual service selects at least a portion of the application data to provide for display within a user interface. In some configurations, the selected application data is displayed within a user interface that maintains a same look and feel regardless of the application data that is displayed.

17 Claims, 14 Drawing Sheets

(56) References Cited

U.S. PATENT DOCUMENTS

| | | | |
|---|---|---|---|
| 2002/0107875 A1 | 8/2002 | Seliger et al. | |
| 2002/0173295 A1 | 11/2002 | Nykanen et al. | |
| 2003/0018692 A1 | 1/2003 | Ebling et al. | |
| 2007/0130541 A1 | 6/2007 | Louch et al. | |
| 2009/0224867 A1* | 9/2009 | O'Shaughnessy | H04M 1/72569 340/5.1 |
| 2010/0235766 A1 | 9/2010 | Fujioka | |
| 2011/0055890 A1* | 3/2011 | Gaulin | G06F 21/6218 726/1 |
| 2011/0264656 A1* | 10/2011 | Dumais | G06F 17/3087 707/728 |
| 2012/0032945 A1* | 2/2012 | Dare | G06F 3/0481 345/418 |
| 2012/0042036 A1 | 2/2012 | Lau et al. | |
| 2012/0117499 A1 | 5/2012 | Mori et al. | |
| 2012/0209839 A1* | 8/2012 | Andrews | G06Q 10/10 707/728 |
| 2013/0061218 A1* | 3/2013 | Moore | G06F 8/62 717/177 |
| 2013/0110992 A1* | 5/2013 | Ravindra | H04W 4/185 709/220 |
| 2013/0218877 A1 | 8/2013 | Satyanarayanan | |
| 2013/0218885 A1 | 8/2013 | Satyanarayanan | |
| 2013/0295956 A1 | 11/2013 | Ding et al. | |
| 2014/0019427 A1 | 1/2014 | Wan et al. | |
| 2014/0089913 A1* | 3/2014 | Aaronson | G06F 8/61 717/174 |
| 2014/0259017 A1* | 9/2014 | Murray | G06Q 10/10 718/102 |
| 2015/0072663 A1* | 3/2015 | Chande | G06Q 10/10 455/414.1 |
| 2015/0149489 A1 | 5/2015 | Hariharan et al. | |
| 2015/0149921 A1 | 5/2015 | Hariharan et al. | |
| 2015/0341290 A1 | 11/2015 | Cherifi et al. | |
| 2016/0085763 A1* | 3/2016 | Tatourian | H04L 67/10 707/662 |
| 2016/0239282 A1 | 8/2016 | Evans | |
| 2016/0239352 A1 | 8/2016 | Evans | |
| 2016/0239578 A1 | 8/2016 | Evans | |
| 2016/0261603 A1 | 9/2016 | Hariharan et al. | |
| 2017/0315792 A1 | 11/2017 | Evans | |

FOREIGN PATENT DOCUMENTS

| | | |
|---|---|---|
| CN | 103136324 A | 6/2013 |
| CN | 103221948 A | 7/2013 |
| EP | 2451141 | 5/2012 |
| JP | 2004-535000 A | 11/2004 |
| WO | WO 2002/093877 A1 | 11/2002 |
| WO | WO2012022021 | 2/2012 |
| WO | WO2012129663 | 10/2012 |
| WO | WO 2014/210078 A1 | 12/2014 |

OTHER PUBLICATIONS

Office action for U.S. Appl. No. 14/623,875, dated Nov. 19, 2015, Evans, "Context Sensitive Framework for Providing Data From Relevant Applications", 16 pages.

Office action for U.S. Appl. No. 14/623,893, dated Mar. 11, 2016, Evans, "Context Sensitive Framework for Providing Data From Relevant Applications", 19 pages.

Office action for U.S. Appl. No. 14/623,875, dated Jun. 20, 2016, Evans, "Context Sensitive Framework for Providing Data From Relevant Applications", 17 pages.

PCT Search Report and Written Opinion dated May 4, 2016 for PCT application No. PCT/US2016/018249, 12 pages.

Office action for U.S. Appl. No. 14/623,875, dated Oct. 4, 2016, Evans, "Context Sensitive Framework for Providing Data From Relevant Applications", 17 pages.

International Patent Application No. PCT/US2016/018249; Int'l Preliminary Report on Patentability; dated Aug. 31, 2017; 8 pages.

U.S. Appl. No. 14/623,913; Non-Final Office Action; dated Feb. 22, 2018; 21 pages.

U.S. Appl. No. 14/623,913; Non-Final Office Action; dated Feb. 23, 2017; 18 pages.

U.S. Appl. No. 14/623,913; Final Office Action; dated Oct. 30, 2017; 20 pages.

Singapore Patent Application No. 11201706611R; Written Opinion; dated Mar. 22, 2018; 5 pages.

U.S. Appl. No. 14/623,913; Final Office Action; dated Sep. 5, 2018; 24 pages.

U.S. Appl. No. 14/623,913; Non-Final Office Action; dated Feb. 8, 2019; 16 pages.

U.S. Appl. No. 14/623,913; Final Office Action; dated Oct. 1, 2019; 17 pages.

U.S. Appl. No. 14/623,913; Notice of Panel Decision from Pre-Appeal Brief Review; dated Feb. 25, 2020; 2 pages.

\* cited by examiner

US 10,684,866 B2

CONTEXT SENSITIVE FRAMEWORK FOR PROVIDING DATA FROM RELEVANT APPLICATIONS

BACKGROUND

These days there are a large number of software applications that are available to users of mobile computing devices. For instance, some electronic marketplaces include over a million different applications. Many of these applications are available free of charge or at a low cost as compared to traditional desktop software applications. A user might obtain applications by wirelessly connecting to the electronic marketplace, browsing the available applications, and downloading selected applications.

Trying to find applications among the millions of available applications, however, can be challenging for a user. For example, it may be difficult for a user to decide on a particular application to download, as there may be hundreds of available applications that provide the same or similar functionality. A user might look at customer ratings for help in determining what applications to obtain. The user might also download and try out applications. For example, some users download hundreds of applications to their mobile computing device. Even after installing an application on the mobile computing device, however, the user might not always remember that the application is available for use. Further, after installing an application, the user may still need to find the application on their device and launch the application when they want to use the application.

It is with respect to these and other considerations that the disclosure made herein is presented.

DETAILED DESCRIPTION

Figure 1:
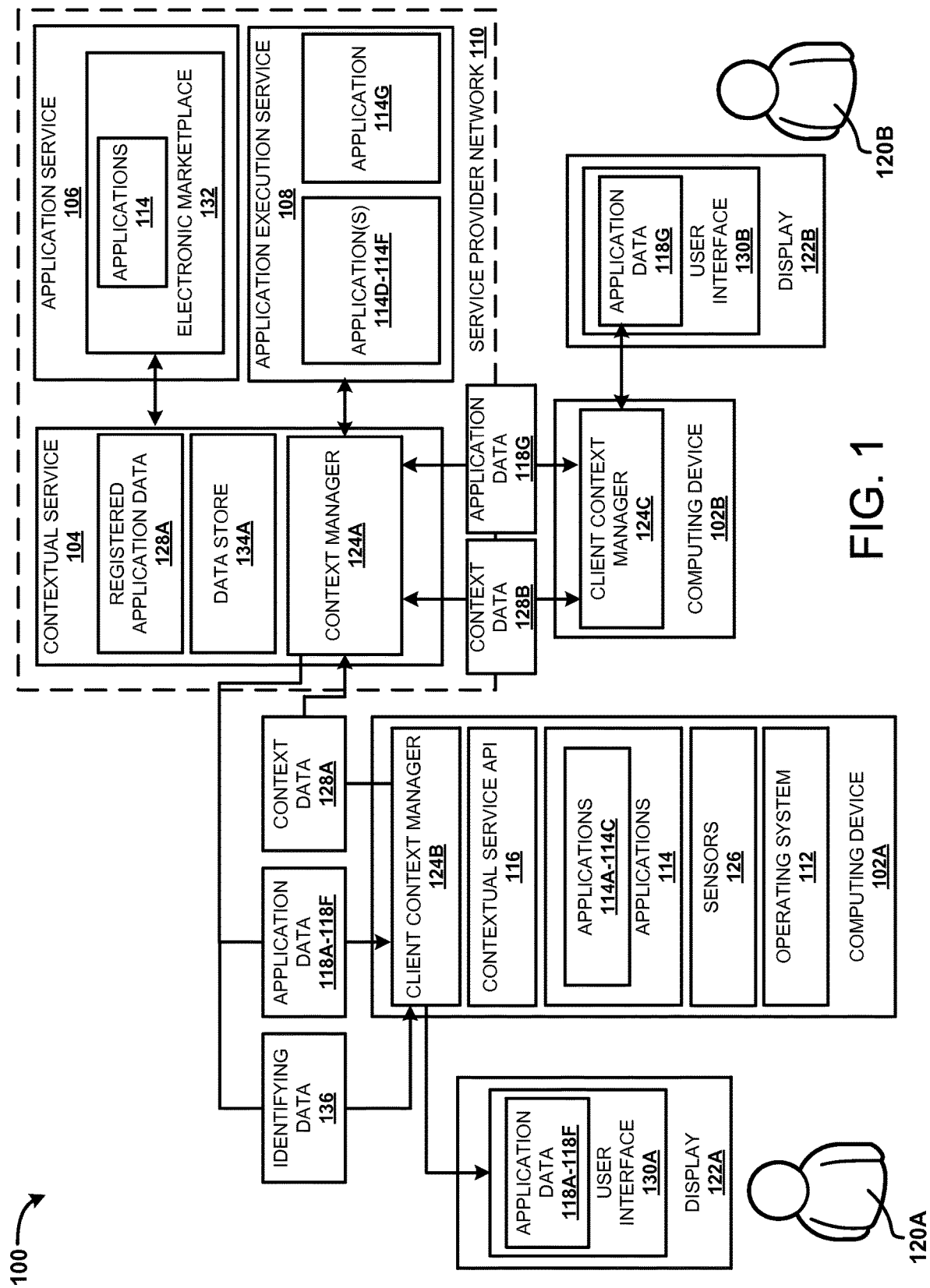
FIG. 1 is a block diagram depicting an illustrative operating environment in which applications relevant to a current context provide data to a user.

The following detailed description is directed to technologies for using a context sensitive framework to identify relevant applications, such as end-user programs or operating system software, to a current context and to provide data received from the relevant applications. For example, the data might be provided for a user for display and/or to another application or computing device for some other use (e.g., perform functionality using the current context). Through an implementation of the technologies disclosed herein, instead of a user having to manually locate and launch an application, relevant application data may be provided in response to receiving context data that identifies a current context of the user. As used herein, the term "context" may refer to the background, environment, framework, setting or situation that surrounds a particular event or situation. Generally speaking, the term "application" may refer to any set of program instructions or data a processor reads to perform some task or operation. In some examples, an application may be part of the system software (e.g., the operating system) or might be application software (e.g., end-user programs). Context data might include location data, movement data, activity data, user data, time data, and the like. Some of the context data might be determined from sensors associated with a computing device. For example, the sensors of the computing device might be used to determine a speed of the computing device, a location of the computing device, weather conditions, lighting conditions, sound near the user, facial expressions of the user (or some other individual), and the like. The context data might also include data relating to a current activity. For example, a current activity might relate to a user performing a search on the computing device, a user driving a car, a user accessing a particular website, a user entering a restaurant, and the like.

A contextual service uses the context data to identify applications that are relevant to the context. As used herein, the term "relevant" may refer to an application that provides data and/or functionality that is applicable to the current context. An application may be determined to be relevant for a particular context using registration data. According to some configurations, applications and/or computing devices register with the contextual service to receive notifications, or be activated, in response to the contextual service receiving specified context data. In some configurations, applications or computing devices may receive the context data without registering. As an example of using context data, fitness applications may be activated when the context data indicates that the user is walking or jogging, global positioning system ("GPS") applications may be activated when the context data indicates that the user is moving (e.g., driving) or the user is at a location that might utilize GPS (e.g., a golf course). Similarly, car rental applications might be activated when the context data indicates that the user is located in an airport, is making a flight reservation, or is performing a search for rental cars. In other examples, a computing device might be activated and/or be configured to perform some action in response to receiving context data. For instance, a thermostat might be configured to change a temperature setting in response to receiving context data indicating that the user is coming home. As other non-exhaustive examples, context data can include any information about: location (such as obtained from GPS, Bluetooth, Bluetooth LE, RF, or any other applicable location sensor), time, date, what application the user is using, what features the user is using on a particular application, physical environment (such as temperature, altitude, humidity, biometric pressure) device orientation, the proximity of other devices with relevant data (such as a beacon or friend with a suitable device), the proximity of other users, biometric data (such as pulse, heart rate variability, blood oxygenation, body temperature, blood sugar, sleep, what the user is viewing), and the like.

In response to being activated, the activated applications determine the data to provide that is relevant to the context. In other words, the applications use context data associated with a user to determine and to provide application data that is personalized for the current context. As such, rather than a user having to determine what applications to utilize, the context sensitive framework uses the current context of a user in determining what applications to utilize. In this way, the user does not have to specifically locate and launch an application. In some examples, the context sensitive framework receives application data from more than one application, aggregates the application data, and provides the application data for use. For example, selected application data might be presented in a user interface. For instance, the context sensitive framework may provide a common user interface for data provided by the different applications. In this way, the user is presented with data from different applications in a consistent manner. In addition, this common user-interface may be provided as a part of the operating system, thus allowing the interface of the operating system to change as the context data changes.

The contextual service might also make a determination as to which data provided by different applications is to be provided. For instance, the contextual service may de-duplicate data that overlaps (e.g., is the same or similar) that is provided by different applications. The contextual service might also filter out data based on the current context of the user.

The context of the user or a computing device may also be updated. For example, the computing device may periodically connect with the contextual service to provide further or updated context data to the contextual service. As the context of the user or computing device changes, the applications that were previously determined to be relevant may change. For example, an application that was relevant for one context may not be relevant to an updated context. As such, the contextual service may update the applications determined to be relevant in response to changes in context.

In other examples, the context sensitive framework may present the user with a selection of different applications that are relevant to the current context. For example, the context sensitive framework may present the user with the applications that registered to be activated in response to the current context. After receiving a selection of an application from the user (e.g., through the common UI), the context sensitive framework might launch the application for the user. In some examples, the contextual service may also use temporal data when selecting the applications that are relevant to the context. For instance, when it has been determined that a user has recently eaten, the contextual service may not utilize applications relating to restaurants for some period of time.

In other examples, when the application is not installed on the computing device being utilized by the user, the context sensitive framework might cause the application to be installed on the computing device or might execute the application remotely, such as within a service provider network. In some examples, the determination of whether to install the application on the computing device of the user may be based on whether it is likely that the user will frequently use the application. In some instances, an application may be downloaded to the computing device, installed on the computing device and then automatically removed after some period of time. For example, an application that was installed on the computing device may be automatically removed after the context changes and/or the event for which the application was downloaded ends.

As briefly described, the context sensitive framework provides two-way communication between applications and the context sensitive framework. According to some configurations, the context sensitive framework allows two or more applications to communicate with each other. For example, an application may define a custom event using a contextual service application programming interface ("API") to which other applications may register to receive. Applications may use the custom event to send data to other interested applications. For instance, a travel application may define a custom event that provides travel details for a user. This information might also be used to update the context data received by an application such that the data provided by the application is more applicable to the current context.

In some examples, a mobile computing device is configured to monitor the context of the user and to provide the context data to the contextual service. In some cases, the context data is provided to the contextual service when a network connection is established between the mobile computing device and a remote computing device that is part of the contextual service. Periodically, or in response to a change in context or some other trigger, the context data for the user is provided to the contextual service. The contextual service may be implemented on the computing device and/or within a service provided by one or remote computers. In some examples, the contextual service is provided by a network-based service (e.g., a service provider network).

Software developers may develop applications using a software developer toolkit ("SDK") that may include an API that specifies functionality for connecting the application to a contextual service or other tools that might be used by a software developer to develop an application. For example, the contextual service API may be used by the application to register to be activated or notified in response to one or more contexts. The application might also utilize the API to define one or more custom events, send a message to another application, request to receive context data from a computing device, and the like. The SDK and/or API might also be utilized to change the operation of the operating system and/or some other application. For instance, one part of the operating system might utilize the API to communicate with another part of the operating system in response to receiving certain context data or application data.

Analytics may also be provided to an authorized user, such as a software developer of applications, that relate to the use of the applications by the contextual service. For example, the analytics might be displayed in a graphical user interface ("GUI") and include information such as, but not limited to usage data (e.g., average use), revenue data (e.g., purchases, cost for usage), functionality utilized within the application, and the like. The user may view the analytics to determine how applications are being utilized within the context sensitive framework.

According to some configurations, the contextual service may collect and store data that may be used to improve the recommendations and/or the data provided by the contextual service. The data that may be collected and stored may include context data received from different users and/or computing devices, application data received from various applications, and usage data associated with users of the contextual service. For example, the usage data might include what applications are selected by the users, what applications are utilized by the users, as well as how the users utilize the functionality of the application for different contexts. In some examples, the contextual service may use a machine learning mechanism to improve the recommendations provided by the contextual service. For instance, over time as the contextual service receives more data, the data provided by the contextual service may change based on actual usage data associated with users of the contextual service that is received. The machine learning mechanism may be refined in response to receiving additional data. Additional details regarding the various components and processes described above for selecting and utilizing applications based on context will be presented below with regard to FIGS. 1-14.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

Referring now to FIG. 1, an operating environment 100 is illustrated in which applications relevant to a current context provide data to a user, according to various examples presented herein. The operating environment 100 shown in FIG. 1 includes computing devices 102A-102B, a contextual service 104, an application service 106, and an application execution service 108.

According to some configurations, the computing devices 102A-102B, which may be referred to as "computing devices 102", may each be configured as a tablet computing device, a smart phone, a personal computer ("PC"), a desktop computer, a laptop computer, a notebook computer, other mobile computing devices, a video game system, a set-top box, a smart television, or the like. According to other examples, at least a portion of the functionality of the computing devices 102 may be provided by the application service 106, the application execution service 108, or a service provider network 110 (See the service provider network 110 illustrated in FIG. 12).

The contextual service 104, the application service 106, the application execution service 108 or the service provider network 110 may include one or more application servers, Web servers, data storage systems, network appliances, dedicated hardware devices, and/or other server computers or computing devices for providing the functionality of the different services. In these examples, the computing devices 102 can include minimal hardware for connection to a network-based computing platform via a network (not shown). The computing devices 102 may communicate via the network to access various services or computing resources described herein. For example, the computing devices 102 can access the contextual service 104, the application service 106 and/or the application execution service 108. More details regarding the operation of the contextual service 104, the application service 106, and the application execution service 108 are provided below.

The computing device 102A can be configured to execute an operating system 112, applications 114, a contextual service API 116, as well as other application programs or components. The applications 114 might include Web browser applications, productivity applications (e.g., word processing, spreadsheet, and/or presentation applications), travel applications, fitness applications, restaurant applications, social network applications, or any other applications. In some examples, one or more of the applications 114 may be configured to utilize the contextual service API 116. According to some configurations, the applications might be part of the operating system 112 and/or some other component. Although the computing device 102B is not shown in the same detail as the computing device 102A, it should be understood that the computing device 102B, as well as other computing devices, may be identically configured or may have more or fewer application programs and/or components than are illustrated for the computing device 102A.

The application service 106 may be configured to provide support for the contextual service 104. For example, as discussed in more detail below, the contextual service 104 may utilize the application service 106 to obtain one or more applications 114 that are relevant to a current context associated with a user (e.g., the user 120A or 120B).

Input to the applications 114 may be provided via one or more input devices that are connected to or otherwise are in communication with the computing device 102A. Input to the applications 114 can be used to control aspects of the application 114, such as navigating menus. The computing device 102A may also be configured to present the visual content provided by one or more applications 114 on one or more display devices that are built-in to or are external to and in communication with the computing device 102A, such as a display 122A.

The display 122A is an output device configured to present information in a visual form. In particular, the display 122A may present visual content provided by the contextual service 104, the client context manager 124B, an application 114, and the like. The visual content might include GUI elements, text, images, video, notifications, virtual buttons, virtual keyboards, messaging data, Internet content, device status, time, date, calendar data, preferences, map information, location information, and any other information that is capable of being presented in a visual form. In some examples, the display 122A is a liquid crystal display ("LCD") utilizing any active or passive matrix technology and any backlighting technology (if used). In other examples, the display 122A may be an organic light emitting diode ("OLED") display. Other display types are contemplated. In addition, the display 122A can include an input device such as a touchscreen or multi-touch enabled touchscreen.

All or a portion of the applications 114 may utilize a contextual service API 116 to interact with the contextual service 104, the application service 106 and/or the application execution service 108. As discussed above, the applications 114 might be any instructions or data that provide one or more functions. The applications 114 may be configured to call one or more methods exposed by the contextual service API 116 to access the contextual service 104 via a network to take advantage of one or more of the features provided by the contextual service 104. The applications 114 can also be configured to call one or more methods exposed by the contextual service API 116 to access the application service 106 or the application execution service 108. For example, the contextual service API 116 may be used by one or more of the applications 114 to register to receive notifications, and possibly be activated, in response to a current context of the user 120A. The contextual service API 116 might also be used to send data to another application 114, request data relating to a current context, and the like.

A user 120A may interact with the contextual service 104 using the computing device 102A. In some examples, the UI 130A that is displayed on the display 122A may be used to view and interact with the contextual service 104.

As illustrated, the contextual service 104 includes the context manager 124A that manages one or more sessions during which a computing device, such as the computing device 102A, interacts with the contextual service 104. The contextual service 104 may support connections to any number of computing devices 102 so that one or more users utilizing the various computing devices 102 can share data with the contextual service 104, the application service 106, the application execution service 108, and possibly with one another. As such, the illustrated example is merely illustrative, and should not be construed as being limiting in any way.

In the current example illustrated in FIG. 1, a context sensitive framework that includes the contextual service 104 identifies applications 114 that are relevant to a current context of a user (e.g., the user 120A or 120B) and provides application data 118 received from the relevant applications 114 to the user. As briefly discussed above, instead of a user having to manually locate and launch an application 114, the relevant applications 114 to a current context of the user may provide application data 118 that is relevant to the current context of the user.

In order to determine a current context for a user, the client context manager 124 might utilize one or more of the sensors 126 of the computing device 102A. The sensors 126 might be configured to determine at least a portion of the context data 128A. For examples, the sensors 126 might determine location data, movement data (e.g., speed or acceleration data), weather data, biometric data, time data, lighting data, facial recognition data, and the like. Some of the context data 128A that is associated with a current context of the user 120A might be determined from the current activity of the computing device 102A. For example, a current activity might relate to a user performing a search, a user launching an application, a user accessing a website, and the like. In some examples, the client context manager 124B aggregates the various data relating to the current context and sends the context data 128A to the contextual service 104.

The contextual service 104 uses the received context data 128A to identify one or more applications 114 that are relevant to the current context of the user 120A. As briefly discussed above, an application 114 may be determined to be relevant for a particular context based, at least in part, on whether the application 114 registered with the contextual service 104 to be activated in response to a current context indicated by the context data 128. For example, the contextual service 104 may determine that the applications 114A-114F are relevant to the context specified by the context data 128A. The applications 114 determined to be relevant may or may not be installed on the computing device 102A. In the current example, the applications 114A-114C are installed on the computing device 102A and the applications 114D-114F are located remotely (e.g., within the application service 106 and/or the application execution service 108).

According to some configurations, applications 114, register with the contextual service 104 to be activated in response to the contextual service 104 receiving a specified context data 128A. For example, fitness applications may register with the contextual service 104 to be activated when the context data 128A indicates that the user is walking or jogging. Other applications 114 may be activated when the context data 128A indicates that the user is moving. Similarly, car rental applications 114 might be activated when the context data 128A indicates that the user 120A is located in an airport, is making a flight reservation, or is performing a search for rental cars. In other examples, the contextual service 104 may determine the applications 114 to activate.

In response to being activated, the activated applications, such as the applications 114A-118F, determine the application data 118A-118F to provide to the contextual service 104 and/or the client context manager 124B or the context manager 124A that is relevant to the context data 128A. In other words, the relevant applications that are activated by the contextual service 104 and/or the client context manager 124B, use the context data 128A to determine the application data 118A to provide. For example, a sports application 114 that is determined to be relevant may provide different application data 118 before a football game (e.g., pregame data) as compared to during a football game (e.g., current score, current stats for the game). Instead of the contextual service 104 requesting specify application data 118 from an application 114, the contextual service 104 is configured to activate the application 114 and provide the application 114 with the context data 128A. In some examples, the contextual service 104 might also request specific data from one or more of the relevant applications 114A-114F. As discussed in more detail below, the applications 114A-114F may be executed on the computing device 102A and/or within the application execution service 108, or on some other computing device.

As illustrated, rather than the user 120A or 120B having to determine what applications 114 to utilize, the context sensitive framework that includes the contextual service 104 uses the current context of a user in determining the applications to utilize. In this way, the user does not have to specifically locate and launch an application 114.

In some examples, the context sensitive framework receives application data 118 from more than one application, aggregates the application data 118, and presents selected application data 118 in a user interface 130, such as the user interface 130A or 130B. For instance, the context sensitive framework may provide a common user interface, which may be a part of the operating system software, to present the application data 118A-118F provided by the different applications 114A-114F. In this way, the user is presented with data from different applications in a consistent manner.

The contextual service 104 might also make a determination as to which application data 118 received from the different applications 114A-114F is to be provided to the user. For instance, the contextual service 104 may remove the duplicate data (or similar data) from the application data 118A-118F. The contextual service 104 and/or the client context manager 124B might also filter out data based on the current context of the user.

In other examples, the contextual service 104 may determine what other computing devices 102 and/or other applications are to receive the application data 118. For instance, the contextual service 104 might provide the application data 118 to other computing devices within a home of the user in response to determining that the user is either at home, or is traveling home and will arrive within a specified period of time. As another example, the contextual service 104 might provide the application data 118 to other computing devices, such as those in a car in order to start the car, in response to determining that the user is about to get in the car. This could also include loading mapping or directions software with the user's likely destination, as well as providing traffic-related information.

The context data 128 associated with the user 120A may also updated with the contextual service 104. For example, the computing device 102A may connect with the contextual service 104 to provide further or updated context data 128A to the contextual service 104. As the context data 128A associated with the current context of the user changes (e.g., the location of the user changes), the applications 114A-114F that were previously determined to be relevant may no longer be determined to be relevant. For example, an application that was relevant for one context may not be relevant to an updated context. As such, the contextual service 104 may update the relevant applications in response to changes in context.

In other examples, the context sensitive framework may present the user with a selection of different applications that are relevant to the current context. For example, the contextual service 104 may present the user 120B with a selection of applications 114 that registered to be activated in response to the current context. After receiving a selection of an application from the user, such as through the UI 130B, the contextual service 104 might cause the selected application 114G to be launched. In some configurations, the selected application 114G might be launched within the application execution service 108. In other configurations, the selected application 114G may be launched on the computing device 102B.

When the selected application 114G is not installed on the computing device 102B being utilized by the user, the contextual service 104 might cause the application 114G to be installed on the computing device 102B. In some examples, the determination of whether to install the application 114G on the computing device 102B may be based on a prediction of how often the user 120B might use the application 114G. For example, in some cases a selected application 114G might only be utilized once (e.g., an application for a specific event). In some instances, the client context manager 124C may connect to the electronic marketplace 132, download the application 114G to the computing device 102B, and cause the application 114G to be installed on the computing device 102B. After installation of the application 114G, the client context manager 124C may launch the application 114G and then, possibly, at some later point automatically remove the application 114G from the computing device 102B. For example, the application 114G might be removed after an event the application 114G has completed (e.g. after a few hours, a few day, or the like). For instance, if a user is going to a football game, the application 114G may be automatically downloaded, then removed once that user has left the football game.

When the application execution service 108 executes the selected application 114G (or some other remote computing device) the context manager 124A of the contextual service 104 may provide the application data 118G generated the by application 114G to the client context manager 124C. The application data 118G might be the application data 118G that is relevant to the context data 128B or might be some other portion or all of the data generated by the application 114G.

As briefly described above, the context sensitive framework provides two-way communication between applications 114 and the contextual service 104. According to some configurations, the context sensitive framework allows two or more applications 114 to communicate with each other. More details for two or more applications 114 using the context sensitive framework to communicate are provided below with regard to FIG. 2.

In some examples, the client context manager 124B or 124C is configured to monitor the context of the user and to provide the context data 128A or 128B to the contextual service 104. In some cases, the context data 128 is provided to the contextual service 104 when a network connection is established between the computing device 102 and a remote computing device that is part of the contextual service 104.

In some examples, software developers may develop applications 114 using a software developer toolkit ("SDK") that may include an application programming interface ("API"), such as the contextual service API 116, that specifies functionality for connecting the application 114 to the contextual service 104 or other tools that might be used by a software developer to develop an application. For example, the contextual service API 116 may be used by the application to register to be activated or notified in response to one or more contexts. The application 114 might also utilize the contextual service API 116 to define one or more custom events that may be used to communicate data to another application 114 and/or to the contextual service 104.

As briefly discussed above, the contextual service 104 may collect and store data, such as in the data store 134A, that may be used to improve the recommendations, such as the identifying data 136 and/or the application data 118A-

118F that is provided by the contextual service. The data that may be collected and stored by the contextual service 104 may include the context data 128 received from different users and/or computing devices, application data 118 received from various applications, and usage data associated with users of the contextual service. For example, the usage data might include what applications are selected by the users, what applications are utilized by the users, as well as how the users utilize the functionality of the application for different contexts.

Figure 5:
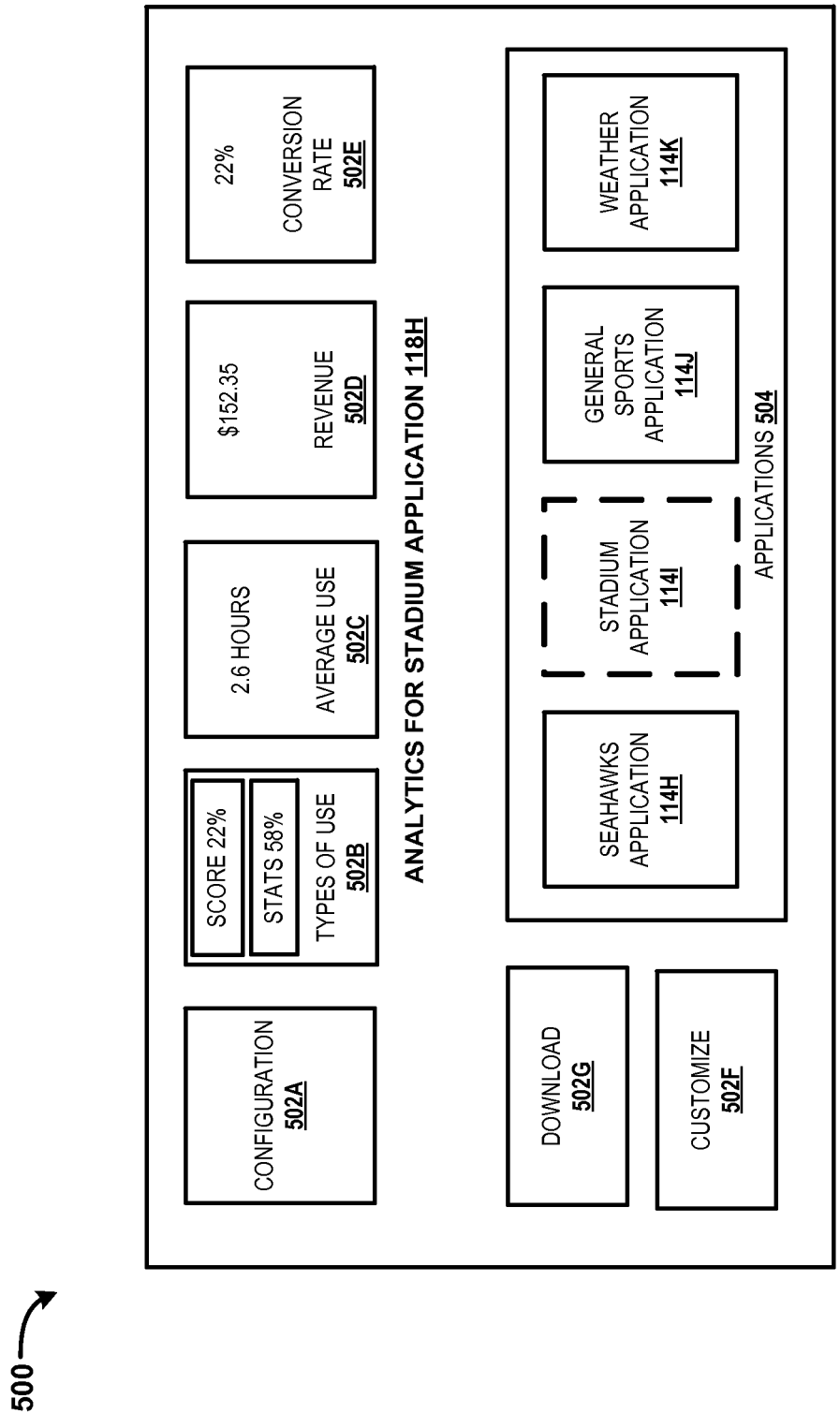
FIG. 5 is a screen diagram showing an illustrative GUI that displays analytics relating to a use of one or more applications within the context sensitive framework.

In some configurations, the contextual service 104 may use a machine learning mechanism to improve the recommendations provided by the contextual service. The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification applications 114 that are data provided by the contextual service 104. The model may be trained using supervised and/or unsupervised learning. For instance, over time as the contextual service receives more data, the data provided by the contextual service may change based on actual usage data associated with users of the contextual service that is received. The machine learning mechanism utilized by the contextual service 104 may be refined in response to receiving additional data Analytics may also be provided to a software provider, or some other authorized user, that relate to the use of the applications 114 by one or more users utilizing the context sensitive framework. For example, the analytics might be displayed in a GUI and include information such as, but not limited to usage data (e.g., average use), revenue data (e.g., purchases, cost for usage), functionality utilized within the application, and the like. The software provider may view the analytics to determine how their applications are being utilized within the context sensitive framework. FIG. 5 illustrates an exemplary GUI 500 that may be used to provide the analytics.

In some examples, the application service 106 provides the electronic marketplace 132 through which users can purchase content, such as, for example, the applications 114, application add-ons, in-application items, music, e-books, movies, and the like. It should be understood that various implementations of the operating environment 100 include multiple networks, contextual services 104, application services 106, application execution services 108, applications 114 and contextual service APIs 116. As such, the illustrated operating environment 100 should be understood as being illustrative, and should not be construed as being limiting in any way.

Figure 2:
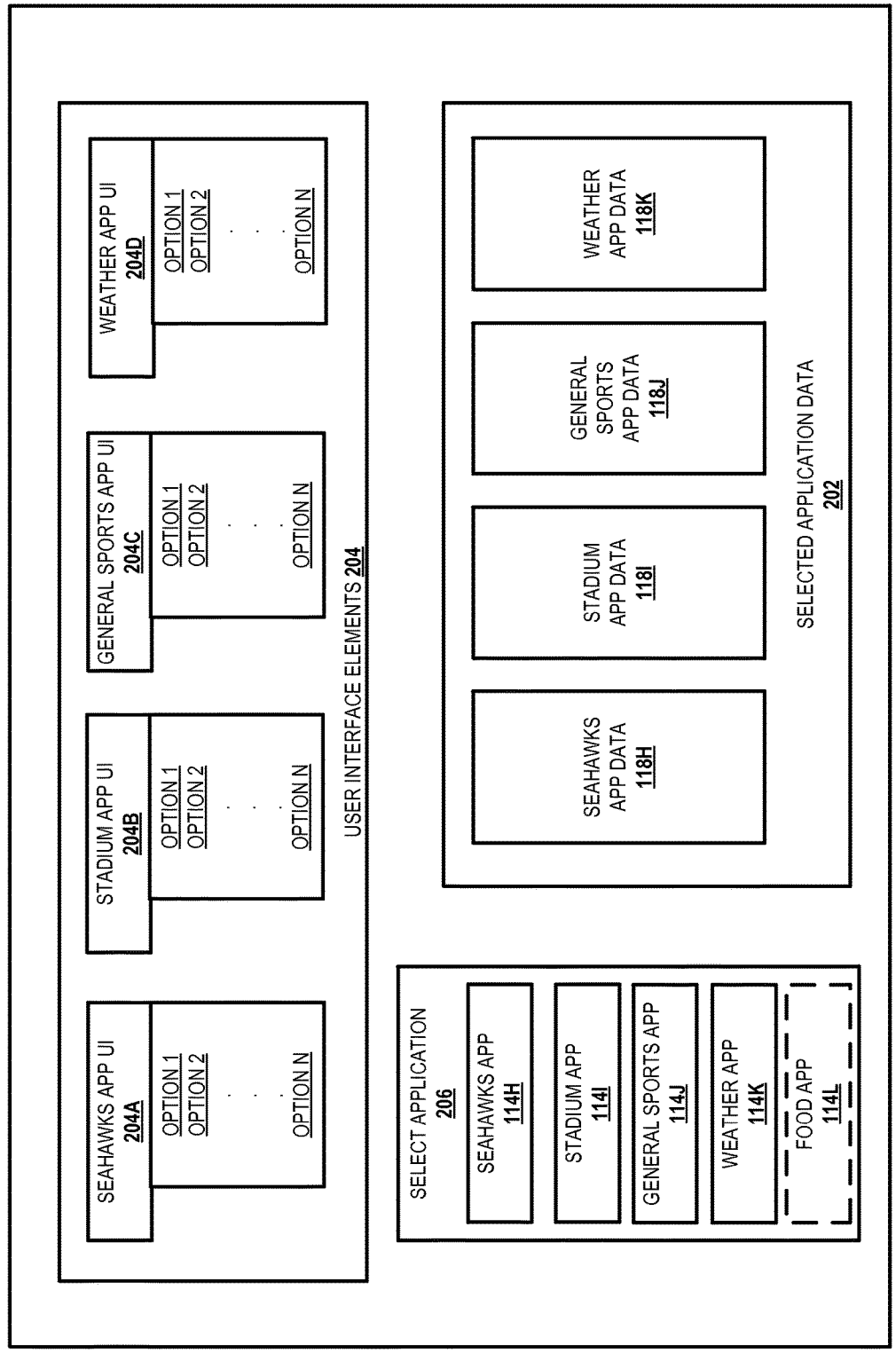
FIG. 2 is a screen diagram showing an illustrative graphical user interface ("GUI") that displays application data received from different applications.

FIG. 2 is a screen diagram showing an illustrative GUI 200 that displays application data 118 received from different applications 114. GUI 200 could be part of an end-user program or the operating system of the computing device, or a combination thereof. As illustrated, the GUI 200 shows data from different applications that are relevant to a current context of a user, such as the user 120A or 120B. The computing device 102A that is in communication with the contextual service 104 might display the GUI 200. For purposes of explanation, and not intended to be limiting, assume that the GUI 200 is being used by a user that is currently at a SEATTLE SEAHAWKS football game. For instance, the context data 128 may indicate that the user is located in the sports stadium where the Seattle Seahawks play.

As discussed above, one or more applications 114 may provide application data 118 to the contextual service 104 in response to being activated. In response to receiving the context data 128 that is associated with the user that is at the football game, the contextual service 104 has identified a Seahawks application 114H, a stadium application 114I, a general sports application 114J, a weather application 114K, and a food application 114L that are relevant to the context data 128. The user might select or deselect the applications 114 to utilize by selecting a user interface element within the select application UI element 206. As discussed above, a user might not choose to receive data from all the applications determined to be relevant to the context data 128. In this example, the user has decided not to include the use of the food application 114L as indicated by the dashed line around the food application 114L. In some examples, the selections received from the user may be provided to the contextual service 104 and used to update the model utilized by the machine learning mechanism. In this way, the applications identified to be relevant to a certain context may change over time in response to the selections made by the users of the contextual service.

In the current example, the GUI 200 shows application data 118H-118K from a portion of the applications 114H-114L identified to be relevant to the current context. The GUI 200 shows the application data within the selected application data UI element 202. The GUI 200 also shows user interface elements that are associated with the selected applications 114-114L within the user interface elements section 204. The user interface elements section 204 shows the user interface elements for the Seahawks application UI 204A, the stadium application UI 204B, the general sports application UI 204C, and the weather application UI 204D. As can be seen, each of the applications UI 204A-204D includes the options 1-N. In some examples, the user interface elements 204 for the different applications 114H-114K may be combined or otherwise displayed in a different manner.

As discussed above, the application data 118 that is displayed within the GUI 200 may be selected, at least in part, by the application providing the application data 118 to the contextual service 104. In other words, instead of requesting specific information from the applications, the contextual service 104 receives application data 118 from the applications that the application determines to be relevant to the context data 128. For example, the Seahawks application 114H might include pre-game information before the game is started, scores and stats for a game while the game is in progress and post-game analysis and reviews after the game. As the context data 128 changes (e.g., the time changes during the game), each of the applications 114H-114K may update the application data 118H-118K that is provided to the contextual service. 104. As discussed above, the contextual service 104 may use a machine learning mechanism when determining what application data to provide.

In some examples, a user might be able to launch an individual application from within the GUI 200. For example, the user might select an option (not shown) within the UI elements shown for the particular application. In other examples, a user might also be able to customize the GUI 200. For instance, in response to selecting a customize UI element (not shown), a user may then be prompted to select the different information that they would like to include in the display of the GUI 200. For example, a user may select from a list (or some other UI element or input method) the application data 118 that they would like displayed as well as how the data is displayed.

Figure 3:
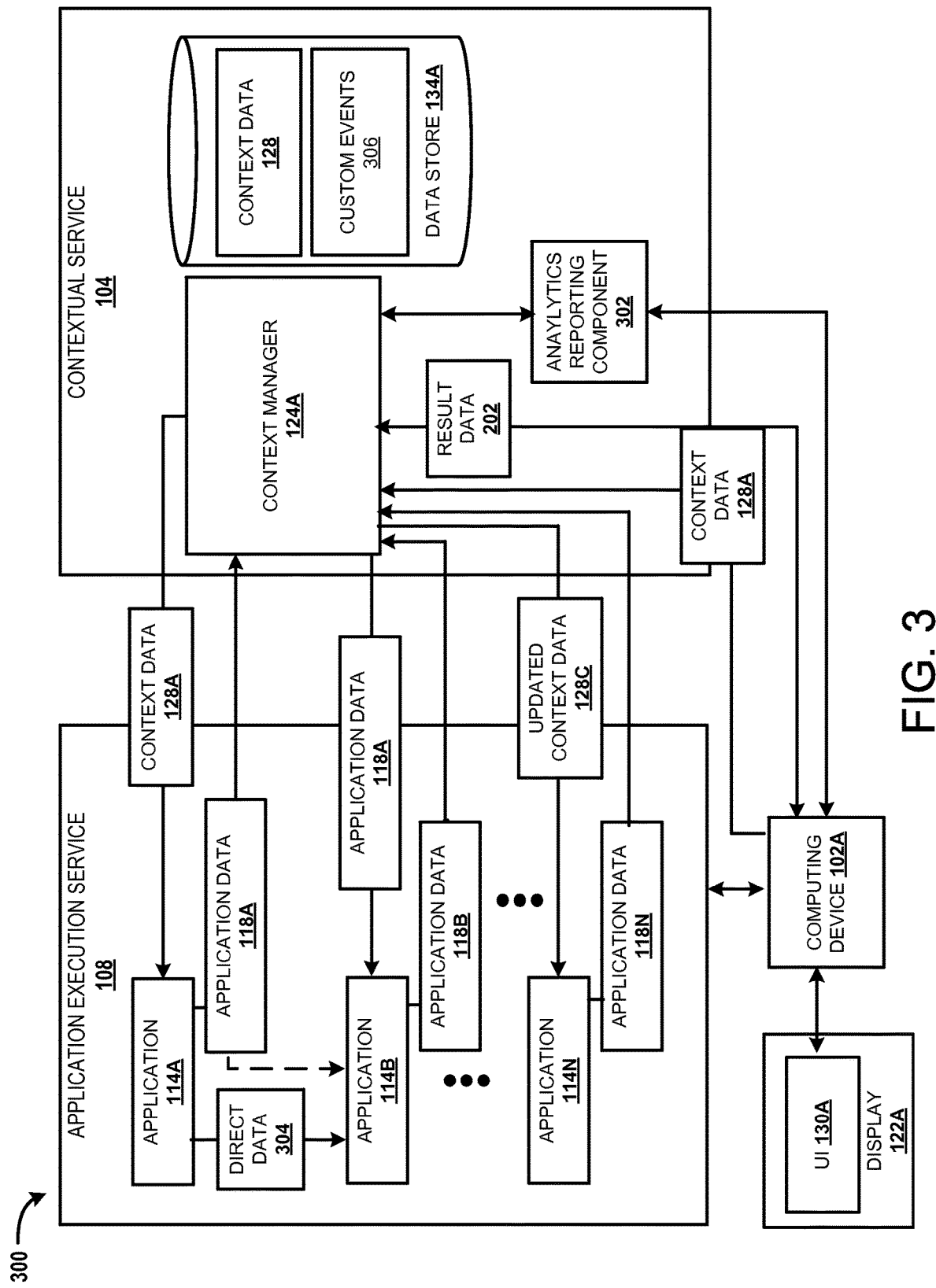
FIG. 3 is a system diagram that illustrates applications using a contextual service for communication.

FIG. 3 is a system diagram 300 that illustrates applications 114 using the contextual service 104 for communication. System diagram 300 includes the contextual service 104 in communication with the application execution service 108. The contextual service 104 may include the context manager 124A, the data store 134A, and a reporting component 302. The application execution service 108 may include one or more computing devices for executing the applications 114A-114N. In other examples, all or a portion of the applications 114A-114N may be executed on the computing device 102A, or some other computing device.

The applications 114A-114N may be configured to send and receive data to/from the contextual service 104. The applications 114A-114N may also utilize the contextual service 104 and the contextual service API 116 to communicate with each other. For example, an application, such as the application 114A may generate the application data 118A in response to receiving the context data 128A. In some examples, all or a portion of the application data 118A may be provided by the contextual service 104 to one or more of the other applications, such as the application 114B. The application data 118A might be provided directly to the application 114B as indicated by the dashed line or indirectly to the application 114B through the context manager 124A.

As discussed above, an application 114, such as the application 114A, may specify one or more custom events to be utilized by the contextual service 104 using the contextual service API 116. For example, the custom events might relate to application data that is provided by the application 114A that other applications might be interested in receiving. For example, the Seahawks application 114H illustrated in FIG. 2 might specify a custom event that provides data about the SEATTLE SEAHAWKS that is not generally available to the other applications. In order to receive the application data 118A that is associated with the custom event specified by the application 114A, the application 114B may register to receive notifications relating to one or more custom events specified by the applications 114. In other examples, an application, such as the application 114A might utilize functionality provided by the contextual service API 116 to directly send direct data 304 to another application, such as the application 114B.

In some examples, the application 114B receiving the direct data 304 and/or the application data 118A from the application 114A may use the data to generate the application data 118B that is provided to the context manager 124A that is part of the contextual service 104. In other configurations, the context manager 124A may use the received application data 118A to update the context data 128A. For example, in some cases, the application data 118A might include additional context data 128 that may be used to update the context that is associated with the user of the computing device 102A. The context manager 124A might provide the updated context data 128C to all or a portion of the applications 114A-114N. In the current example, the context manager 124A has provided the updated context data 128C to the application 114N. The application 114N uses the updated context data 128C to generate the application data 118N.

The reporting component 302 may be configured to provide analytics. For example, the analytics reporting component 302 included in the contextual service 104 may be configured to provide the GUI 500 illustrated in FIG. 5, that displays analytics relating to a user of one or more of the applications 114A-114N. The analytics may be displayed on the UI 130A that is associated with the computing device 102A that may be utilized by a software provider, or some other authorized user. The reporting component 302 may also be configured to create reports that include information relating to one or more of the applications 114A-114N (e.g., configuration information).

Figure 4:
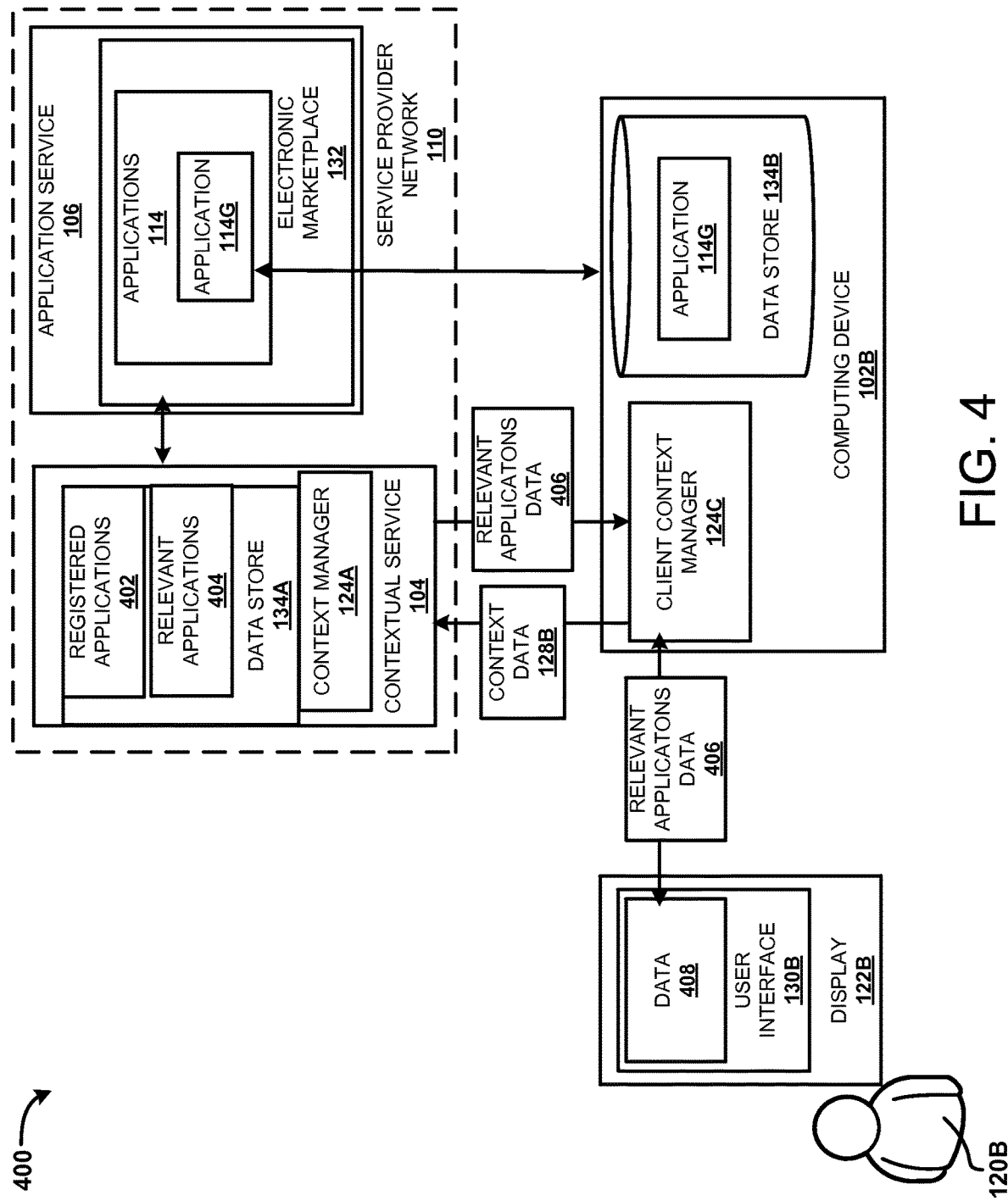
FIG. 4 is a system diagram that illustrates identifying and utilizing an application to perform functionality in response to a current context of a user.

FIG. 4 is a system diagram 400 that illustrates identifying and utilizing an application 114 to perform functionality in response to a current context of a user. System diagram 400 includes the contextual service 104, the application service 106, and the computing device 102B. As discussed above, in some cases, an application 114G identified as being relevant to a current context may be downloaded to the computing device 102B.

According to some configurations, the contextual service 104 receives the context data 128B associated with the user 120B and the context manager 124A determines the applications 114 that are relevant to the context. The context manager 124A might determine the relevant applications 114 from the registered applications 402 that are registered with the contextual service 104. The context manager 124A might also determine the relevant applications 114 from applications 114 that are not registered with the contextual service 104. For example, the context manager 124A might determine the relevant applications 114 from the applications available from the electronic marketplace 132. In some instances, the context manager 124 uses data available from the electronic marketplace 132, or some other source, to determine functionality and/or the popularity of an application.

In the current example, the context manager 124A identifies the relevant applications 404 that are relevant to the context data 128B. For example, the relevant applications 404 might be the applications 114 that registered to be activated in response to the context data 128B. In some configurations, the context manager 124A may select one of the relevant applications 404 to provide to the computing device 102B in response to the context data 128B. In other examples, the context manager 124A may present the user with a selection of different applications that are relevant to the current context. For example, the contextual service 104 may provide relevant application data 406 to be presented in the user interface 130B. In the current example, the user 120B selects the application 114G to be utilized. After receiving a selection of the application 114G from the user 120B, the contextual service 104 might cause the selected application 114G to be downloaded to the computing device 102B.

As discussed above, the determination of whether to install the application 114G on the computing device 102B may be based on a prediction of how often the user 120B might use the application 114G. For example, in some cases a selected application 114G might only be utilized once (e.g., an application for a specific event). In some instances, the client context manager 124C may connect to the electronic marketplace 132, download the application 114G to the computing device 102B, and cause the application 114G to be installed on the computing device 102B. After installation of the application 114G, the client context manager 124C may launch the application 114G and then, possibly, at some later point automatically remove the application 114G from the computing device 102B. For example, the application 114G might be removed after an event the application 114G has completed (e.g. after a few hours, a few day, or the like).

FIG. 5 is a screen diagram showing an illustrative GUI 500 that displays analytics relating to a use of one or more applications within the context sensitive framework. As illustrated in the applications section 504, the GUI 500 shows analytics relating to the applications 114H-114K illustrated in FIG. 2. The data presented in the GUI 500 might be determined by a computing device associated with the contextual service 104, the application service 106, or some other computing device. The GUI 500 may be presented on a computing device, such as the computing device 102B.

For purposes of explanation, and not intended to be limiting, assume that the GUI 500 is being used by a developer of the contextual service 104 to view analytics relating to the use of one or more of the applications 114 that were utilized during a particular time period or with a particular context. The GUI 500 might display a variety of different analytics and UI elements. In the current example, the GUI 500 shows a configuration UI element 502A, a type of use UI element 502B, an average usage UI element 502C, a revenue UI element 502D, and a conversion rate 502E. In the current example, the currently selected application is the stadium application 114I as indicated by the bolded dashed line displayed around the stadium application UI element.

The configuration UI element 502A may display configuration information relating to the stadium application 114I. The types of use UI element 502B may display data indicating how the application is used. In the current example, the types of use UI element 502B indicates that the score functionality of the stadium application 114I was used 22% of the time and the stats functionality of the stadium application 114I was used 58% of the time. In some configurations (not shown) a user might select one or more options that specify to display data that is associated with one or more users. For instance, a user might specify to see analytics on how an application is used in the context of a football game by a single user or a group of users. In other examples, a user might specify to see analytics on how the application is used by users not attending a sporting event. The average usage UI element 502C may display an average number of hours that the stadium application 114I is used during a time period (e.g., daily, weekly, monthly). In the current example, the average usage UI element 502C is configured to display a number of hours for average weekly use by a customer. In other examples, the average usage UI element 502C might be configured to display how much the application is used in other contexts. The revenue UI element 502D may display an average revenue generated during a specified time period. In the current example, the revenue UI element 502D shows an amount of revenue generated during one week. The conversion UI element 502E may display the average conversion rate for an application that may be presented to a user for use.

In some examples, all or a portion of the different UI elements might be selected to obtain additional information or configure different options. A user might select one of the UI elements shown in the applications section 504 to change the currently selected application.

A user might also be able to customize the GUI 500 by selecting the customize UI element 502F. In response to selecting the customize UI element 502F, a user may then be prompted to select the different information that they would like to include in the display of the GUI 500. For example, a user may select from a list (or some other UI element or input method) the analytics that they would like displayed. In another example, the user may select how the plan analytics is to be displayed. For example, the user may request to have the plan analytics displayed as raw data, as a graphical representation (e.g., tables, charts, graphs), or in some other format. A user may also request to have historical information displayed in the GUI 500. For example, a user may request to see a time series display of the usage of the application, or some other data.

The information presented in the GUI 500 might also be downloaded for later use. As illustrated, a user may select the download UI element 502G to download the information to a local data store, a network data store, or to another location. The analytics may be downloaded in one or more formats. For example, a user may download all or a portion of the customer support information as a text file, a spreadsheet file, a word-processing file, or some other file.

FIGS. 6-11 are flow diagrams showing routines that illustrate aspects of using a context sensitive framework to identify relevant applications to a current context and to provide data received from the relevant applications to a user according to an example disclosed herein. It should be appreciated that the logical operations described herein with respect to FIGS. 6-11, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

Figure 6:
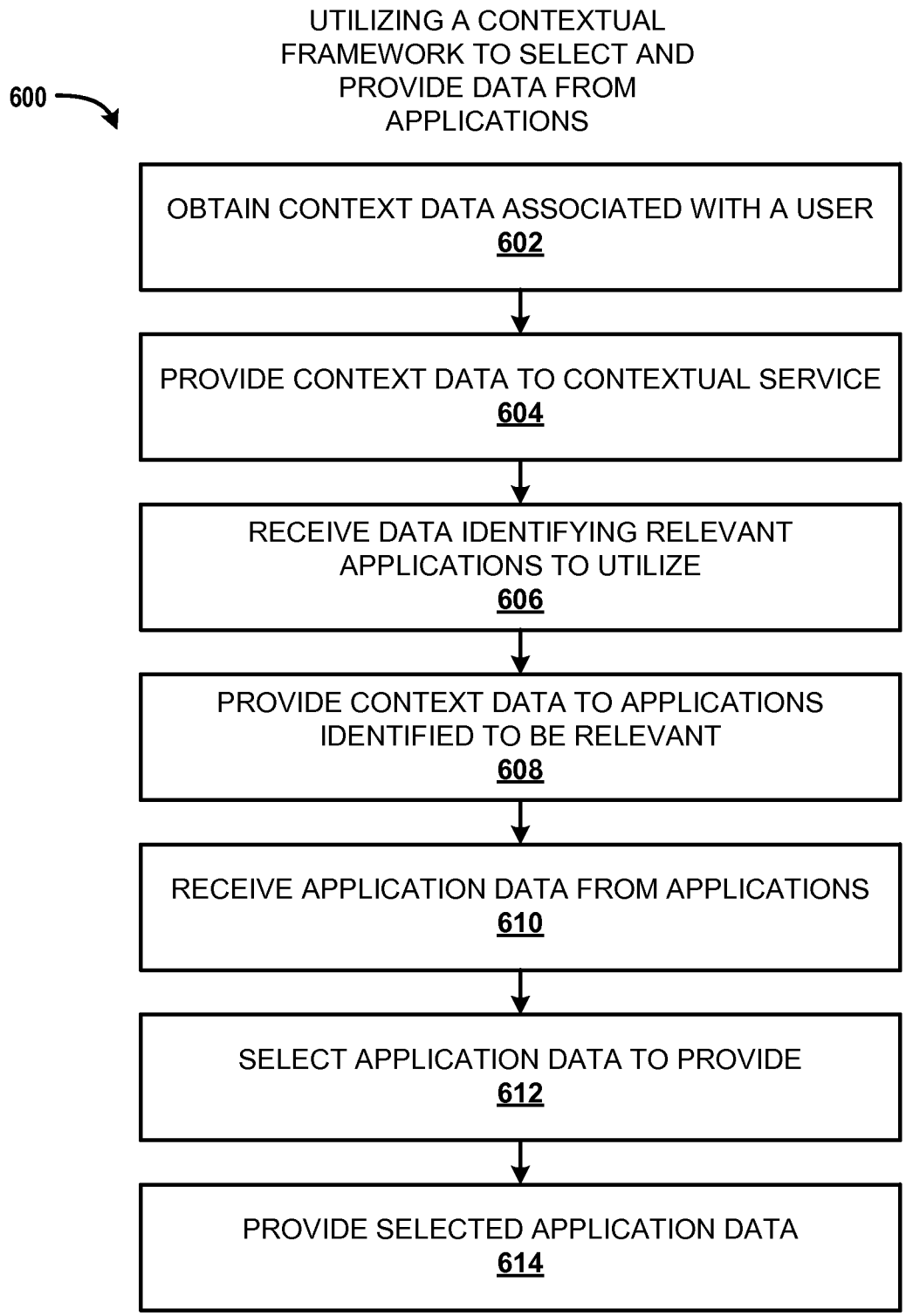
FIG. 6 is a flow diagram showing a routine illustrating aspects of a mechanism disclosed herein for selecting applications and organizing data received from the selected applications using a context associated with a user.

FIG. 6 is a flow diagram showing a routine 600 illustrating aspects of a mechanism disclosed herein for selecting applications and organizing data received from the selected applications using a context associated with a user. The routine 600 may begin at 602, where context data 128 is obtained that is associated with a user. As discussed above, the context data 128 may be obtained by a client context manager 124 operating on a computing device 102 that is associated with a user. The context data 128 may include various context data, such as but not limited to a current time of day, a current location of the user, weather data, what actions are being performed on the computing device 102, and the like.

At 604, the context data 128 is provided to the contextual service. As discussed above, the context data 128 may be provided by the client context manager 124 operating on the computing device 102 to the contextual service 104 or might be provided using some other mechanism. In some examples, the context data 128 is provided to the contextual service 104 and may be updated periodically, or in response to some event or condition. In other examples, the context data 128 might be provided to the contextual service 104 when a network connection is established, and/or at periodic times.

At 606, data is received that identifies relevant applications to utilize. As discussed above, the data that is received may include identifying data 136 that identifies the relevant applications 114. In other examples, the data might include the application itself or the data might include application data 118 provided by the one or more of the applications 114.

At 608, the context data 128 is provided to the applications 114 identified to be relevant. As discussed above, context data 128 might be provided to all or a portion of the applications 114 identified to be relevant. In some examples, the contextual manager 124 operating within the contextual service 104 identifies the most relevant applications 114 and provides the context data 128 received from the computing device 102 to those applications 114.

At 610, application data 118 is received from the applications 114. As discussed above, the application data 118 that is received may be selected by the applications 114 themselves. Instead of the context manager 124 requesting specific types of data from an application 114, the contextual service 104 allows the application 114 to select the application data 118 to provide based on the context data 128 provided the computing device 102.

At 612, the application data 118 to provide to is selected. As discussed above, the application data 118 received from the relevant applications 114 might include duplicate data as well as other data that might not be relevant to the current context. In some examples, the context manager 124 removes duplicate data from the application data 118, prioritizes portions of the application data 118 and formats the application data 118 to be provided. In some examples, the application data 118 is formatted to be provided to the user. In other examples, the application data 118 is formatted to be provided to another application and/or computing device 102.

At 614, the selected data is provided. As discussed above, the selected data may be provided in a user interface 130 that provides a common UI regardless of what applications are being utilized by the contextual service 104. In other examples, the user interface 130 may be the native interface provided by the application 114 or the applications 114 that are relevant to the context data 128. In other examples, the selected data is provided in a format useable by the computing device 102.

Figure 7:
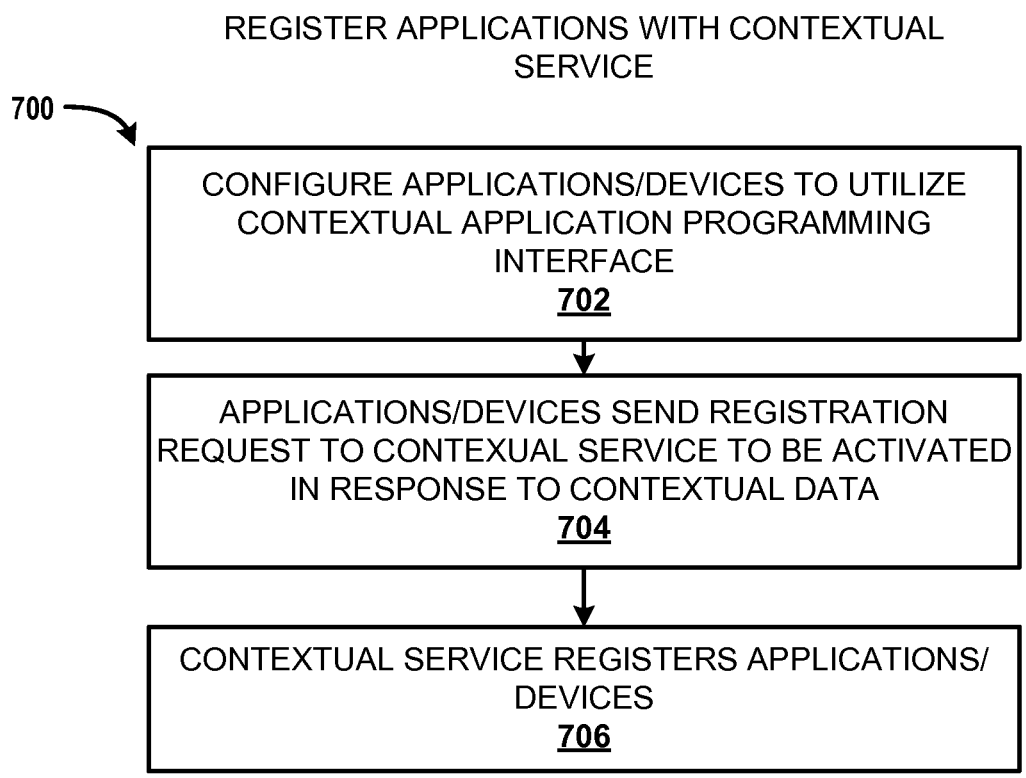
FIG. 7 is a flow diagram showing a routine illustrating aspects of a mechanism disclosed herein for registering applications with a contextual service.

FIG. 7 is a flow diagram showing a routine 700 illustrating aspects of a mechanism disclosed herein for registering applications 114 with a contextual service 104. At 702, applications 114 may be configured to utilize the contextual service API 116. As discussed above, an application 114 may utilize the contextual service API 116 that provides functionality to register with the contextual service 104. For example, an application 114 may register to be activated for various contexts as specified by the context data 128. The applications 114 might also be configured to utilize other functionality of the contextual service API 116, such as defining custom events, communicating with other applications 114, and the like. As discussed above, the applications 114 may be associated with a computing device, such as, but not limited to a thermostat, a thermostat, lighting system, alarm system, car, dishwasher, washing machine, dryer, refrigerator, oven, some other home automation system, and the like. For examples, a lighting device may utilize the API to communicate with the contextual service 104. In some configurations, the applications 114 may be implemented as a system on a chip ("SOC") and may utilize functionality provided by the API.

At 704, the applications 114 register with the contextual service 104. As discussed above, different applications 114 may register with the contextual service 104 to be activated in response to different contexts that may be associated with a user. Some applications 114 may register to be activated in response to one or more different conditions (e.g., specified location at a specified time). As discussed above, in some configurations, the contextual service 104 may provide data to unregistered applications.

At 706, the contextual service registers the applications. As discussed above, after receiving a registration request, the contextual service 104 registers the applications such that the registered applications are activated in response to the specified conditions.

Figure 8:
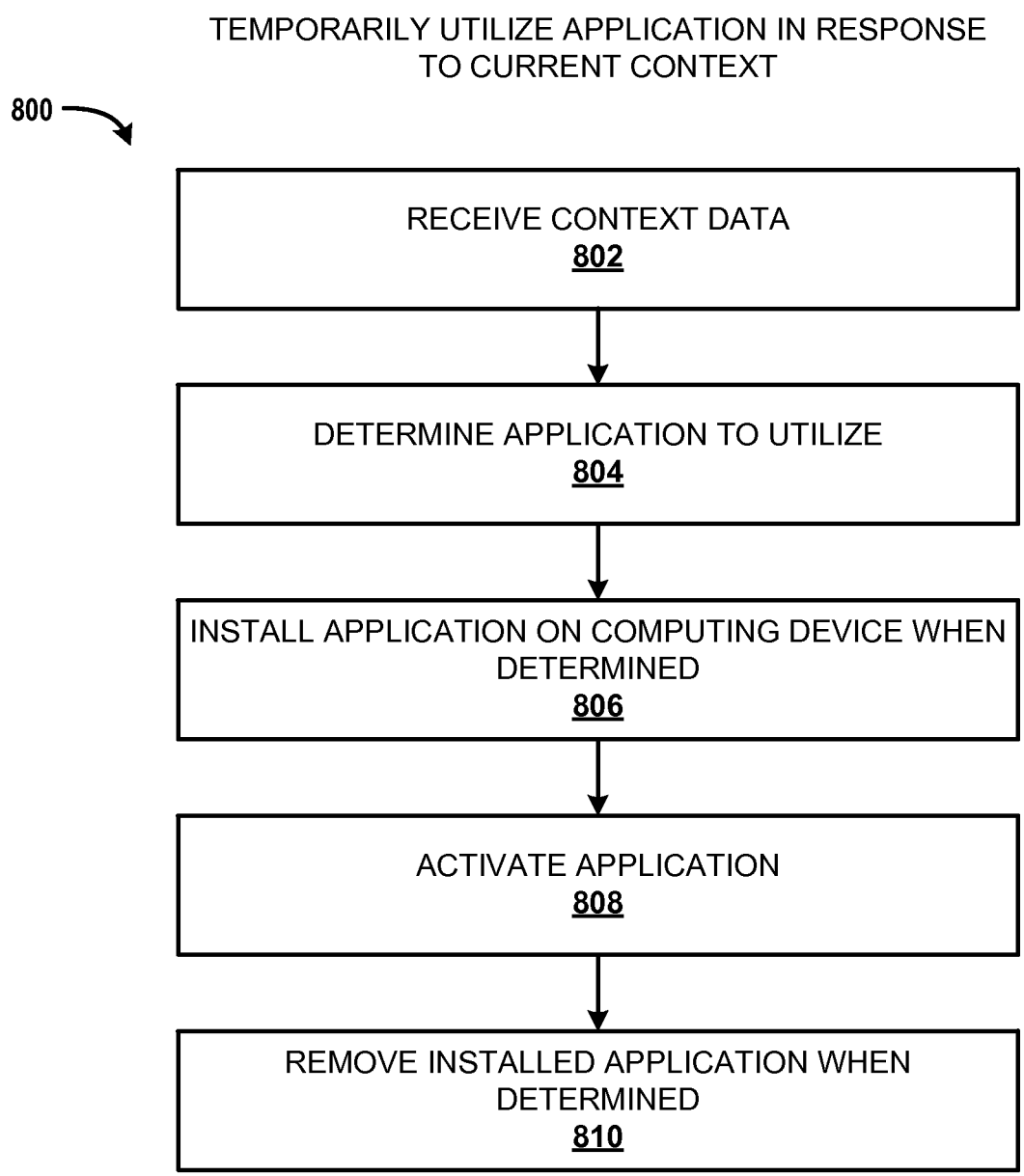
FIG. 8 is a flow diagram showing a routine illustrating aspects of a mechanism disclosed herein for providing access to an application that is not currently available on a computing device associated with a user.

FIG. 8 is a flow diagram showing a routine 800 illustrating aspects of a mechanism disclosed herein for providing access to an application that is not currently available on a computing device associated with a user. The routine 800 may begin at 802, where context data 128 is received. As discussed above, the context data 128 may be received by the context manager 124A operating within the contextual service 104.

At 804, the application to utilize is determined. As discussed above, the contextual service 104 may be used to determine one or more applications 114 that might be utilized by the user associated with the context data 128. In some configurations, the contextual service 104 presents the UI 130 to a user with the applications 114 that have registered for the context data 128. The UI 130 may then be used by the user to receive a selection of at least one of the applications 114 to be utilized. In other examples, the UI 130 may not be presented to receive a selection of an application 114. For instance, the contextual service 104 may select one or more of the applications 114 using the context manager 124A. As discussed above, the context manager 124A may predict whether an application is likely to be utilized by the user using a machine learning mechanism, or some other mechanism. At 806, the application 114 is installed on the computing device 102 when determined. As discussed above, the application 114 may be installed on the computing device 102 when the selected application is currently not available on the computing device.

At 808, the application 114 is activated. As discussed above, the client context manager 124 may cause the application 114 to be activated on a computing device 102. In some examples, the application 114 might be launched on the computing device 102 for use by the user. In other examples, the application 114 might be launched and run on a remote computing device in a service provider network, with the application data being streamed to the user device.

At 810, the application 114 may be removed from the computing device 102 when determined. As discussed above, the application 114 might be removed when a determination is made by the contextual service 104 that the application 114 is not likely to be utilized by the user 120 in the future. In some cases, the application is removed after some period of time or in response to some other condition (e.g., after the context changes).

Figure 9:
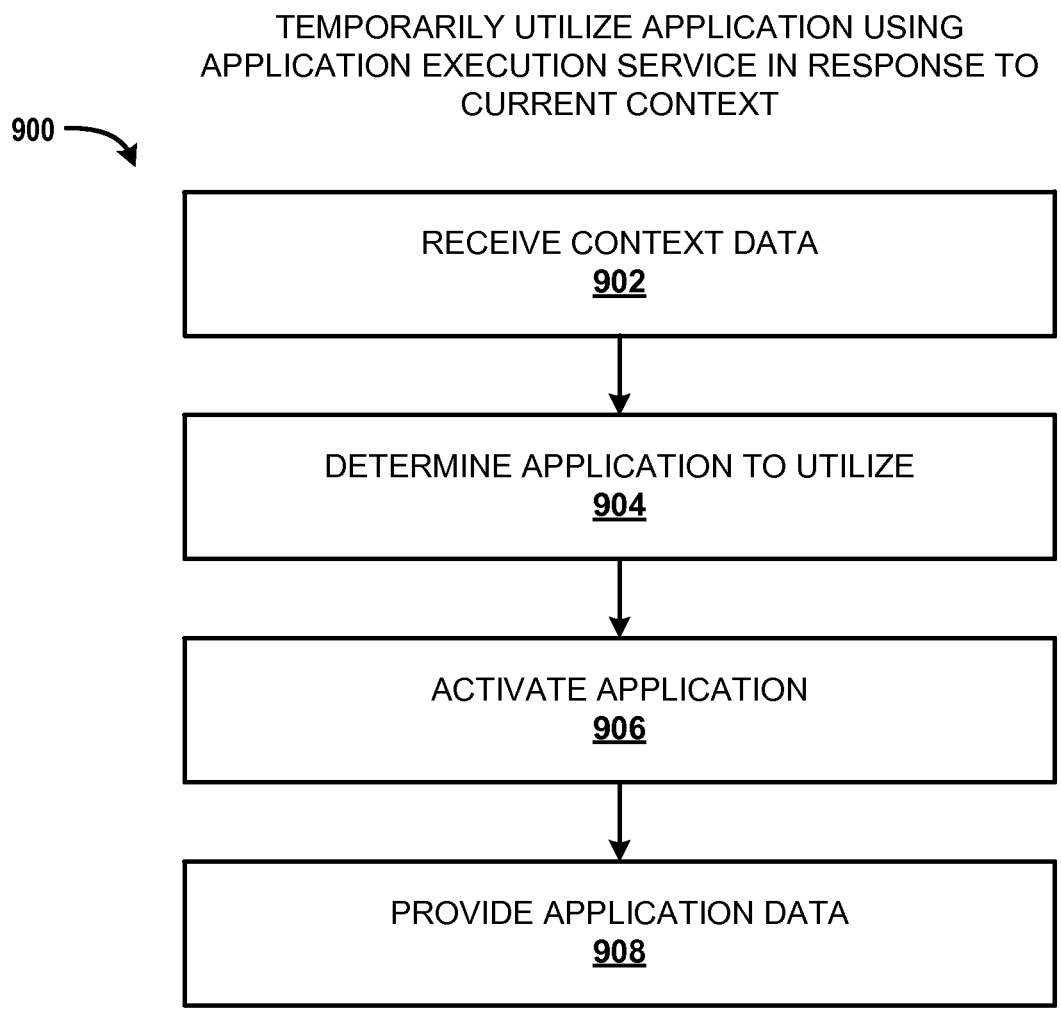
FIG. 9 is a flow diagram showing a routine illustrating aspects of a mechanism disclosed herein for providing access to an application that is not available on a computing device associated with a user.

FIG. 9 is a flow diagram showing a routine 900 illustrating aspects of a mechanism disclosed herein for providing access to an application that is not available on a computing device associated with a user. The routine 900 may begin at 902, where the context data 128 is received. As discussed above, the context data 128 may be received by the context manager 124A operating within the contextual service 104.

At 904, the application to utilize is determined. As discussed above, the contextual service 104 may be used to determine one or more applications 114 that might be utilized by the user associated with the context data 128. In some configurations, the contextual service 104 presents the UI 130 to a user with the applications 114 that have registered for the context data 128. In other examples, the contextual service 104 uses the context data 128 to determine relevant applications 114 that are available from the electronic marketplace 132. The UI 130 may then be used by the user to receive a selection of at least one of the applications 114 to be utilized.

At 906, the application 114 is activated. As discussed above, the application 114 may be executed within the application execution service 108, or on some other computing device.

At 908, the application data 118 is provided. As discussed above, the context manager 124A may provide the application data 118 received from the application execution service 108 to the client context manager 124 operating on the computing device 102. The application data 118 might be provided to the user or used by some other application or computing device 102, such as a smart thermostat, lighting system, alarm system, car, dishwasher, washing machine, dryer, refrigerator, oven, some other home automation system, and the like.

Figure 10:
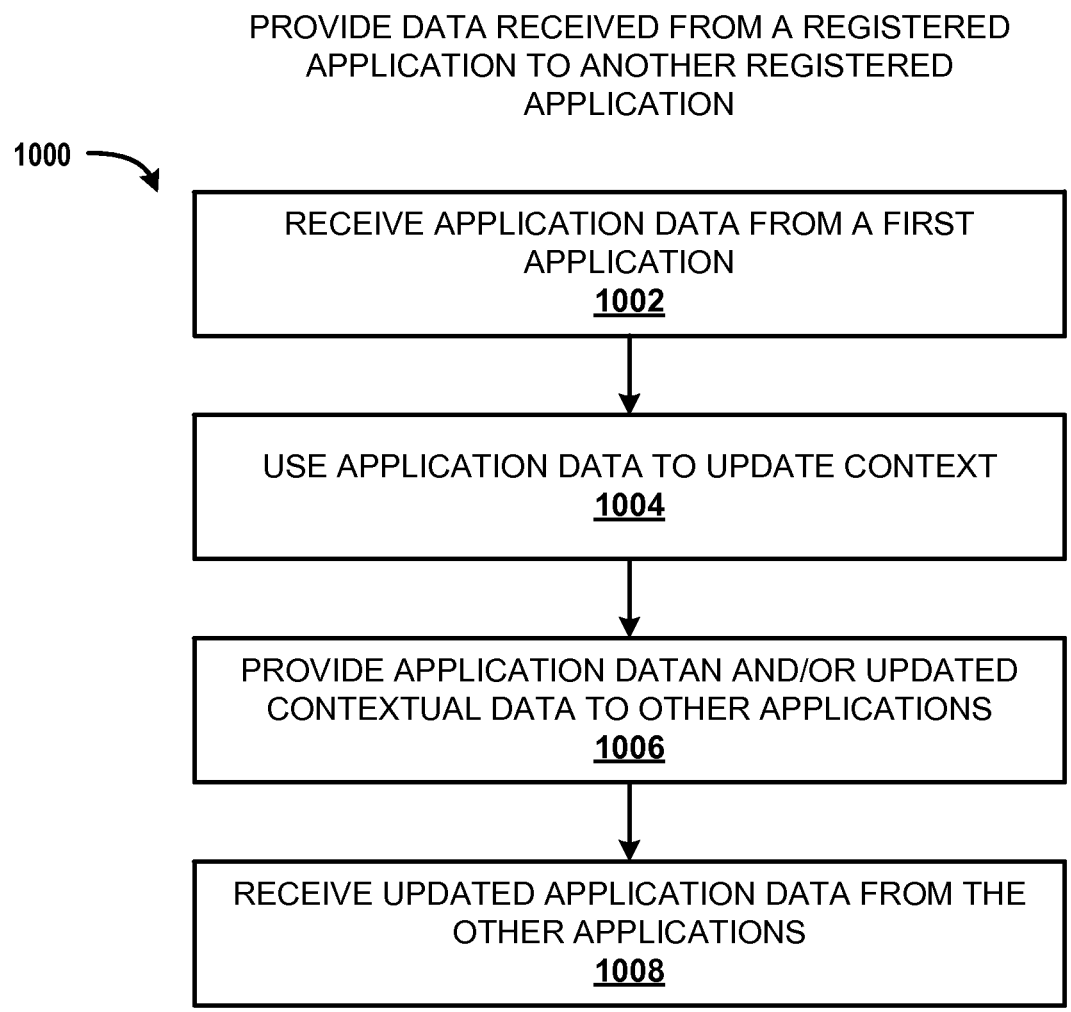
FIG. 10 is a flow diagram showing a routine illustrating aspects of a mechanism disclosed herein for applications to communicate with each other using the contextual service.

FIG. 10 is a flow diagram showing a routine 1000 illustrating aspects of a mechanism disclosed herein for applications to communicate with each other using the contextual service. The routine 1000 may begin at 1002, where application data 118 is received from a first application. As discussed above, applications 114 may utilize the contextual service API 116 to register custom events with the contextual service 104. Other applications 114 may register to receive notifications associated with an occurrence of a custom event defined by the first application.

At 1004, the received application data 118 may be used to update the context data 128. As discussed above, the application data 118 received from the first application 114 may provide additional contextual information relating to the current context. In some examples, the application data 118 received from the first application may not be related to the current context. In this case, the contextual service 104 does not update the context data 128.

At 1006, the application data 118 received from the first application and/or the updated context data is provided to one or more other applications 114. As discussed above, the contextual service 104 may provide at least a portion of the application data 118 that is related to the custom event to the applications 114 that registered to receive notifications of the custom event. In some configurations, the contextual service 104 provides the updated context data 128 to each of the other applications 114 that are relevant to the current context. As also discussed, the application data 118 might be provided to another computing device and used to control an operation of that device. For instance, the application data 118 may be provided to a thermostat and used by the application 114 utilized by the thermostat to change a temperature setting.

At 1008, updated application data 118 is received from the other applications. As discussed above, the applications determine what data to provide to the contextual service 104. As such, the updated context data 128 provided by the contextual service 104 may cause the application 114 to provide different application data 118. In some examples, the updated context data 128 may be received from another computing device, such as from a thermostat, lighting system, alarm system, car, dishwasher, washing machine, dryer, refrigerator, oven, some other home automation system, and the like.

Figure 11:
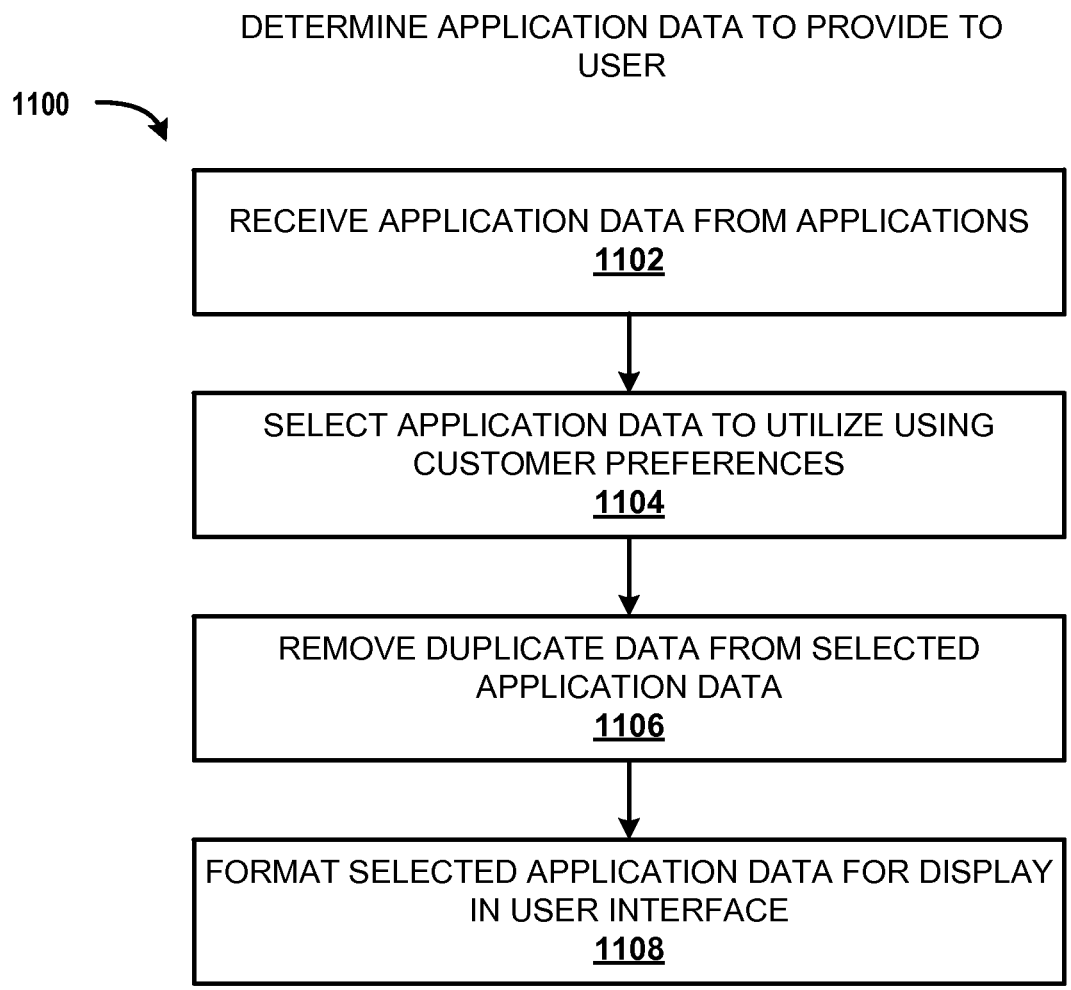
FIG. 11 is a flow diagram showing a routine illustrating aspects of a mechanism disclosed herein for selecting application data to provide to the computing device that is associated with the user.

FIG. 11 is a flow diagram showing a routine 1100 illustrating aspects of a mechanism disclosed herein for selecting application data to provide to the computing device that is associated with the user. The routine 1100 may begin at 1102, where application data 118 is received from applications 114. As discussed above, the application data 118 that is received from the different applications is selected and chosen by the application 114 providing the data. This is in contrast to merely requesting specific data from the application.

At 1104, the application data 118 to provide to the user may be selected using customer preferences. As discussed above, the customer preferences may be determined from preferences specified in one or more customer profiles or might be determined from historical data associated with the user. For example, it may be determined that the user has previously selected certain application data 118, or another application 114, over other application data 118 or other applications 114. The customer preferences might also be determined from explicit settings that may be located within a customer profile, or some other memory.

At 1106, the duplicate data from the selected application data 118 is removed. As discussed above, the application data 118 that is received from the different applications may include data that is duplicated or is similar to each other.

At 1108, the application data is formatted for display in the user interface. As discussed above, the context manager may format the data to be provided within a common user interface 130 such that users are not distracted by the use of different user interfaces associated with each of the different applications.

Figure 12:
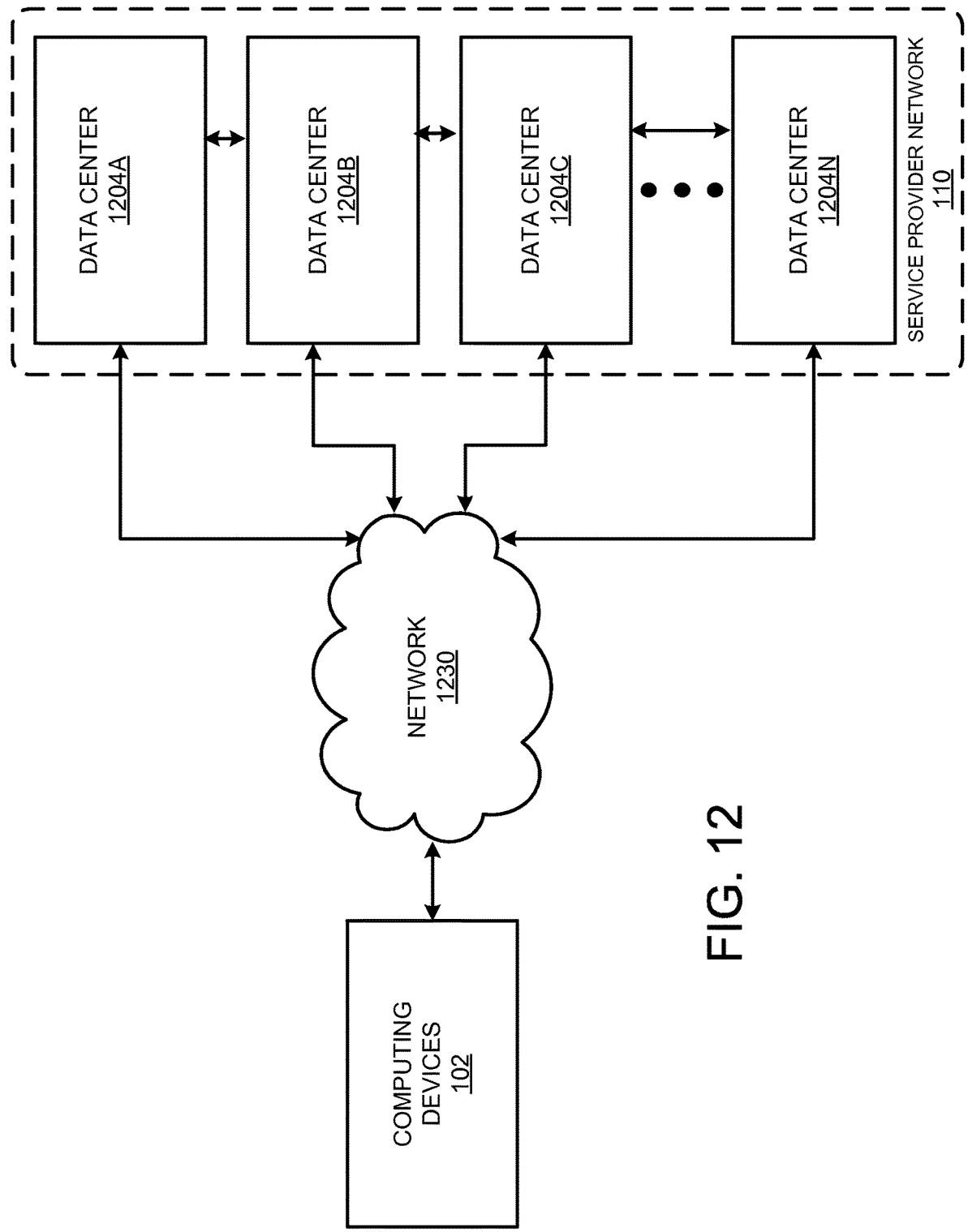
FIG. 12 is a system and network diagram that shows one illustrative operating environment for the examples disclosed herein that includes a service provider network.

FIG. 12 and the following description are intended to provide a brief, general description of a suitable computing environment in which the examples described herein may be implemented. In particular, FIG. 12 is a system and network diagram that shows an illustrative operating environment that includes a service provider network 110. As discussed above, service provider network 110 can provide virtual machine instances and computing resources on a permanent or an as-needed basis.

The computing resources provided by the service provider network 110 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 110 are enabled in one implementation by one or more data centers 1204A-1204N (which may be referred to herein singularly as "a data center 1204" or collectively as "the data centers 1204"). The data centers 1204 are facilities utilized to house and operate computer systems and associated components. The data centers 1204 typically include redundant and backup power, communications, cooling and security systems. The data centers 1204 might also be located in geographically disparate locations. One illustrative configuration for a data center 1204 that implements some or all of the concepts and technologies disclosed herein will be described below with regard to FIG. 13.

The users and customers of service provider network 110 may access the computing resources provided by the data centers 1204 over a suitable data communications network, such as a Wide Area Network ("WAN"), as illustrated by network 1230. Although a WAN might be used, it should be appreciated that a local-area network ("LAN"), the Internet, or any other networking topology known in the art that connects the data centers 1204 to the computing devices 102 may be utilized. It should also be appreciated that combinations of such networks might also be utilized.

Figure 13:
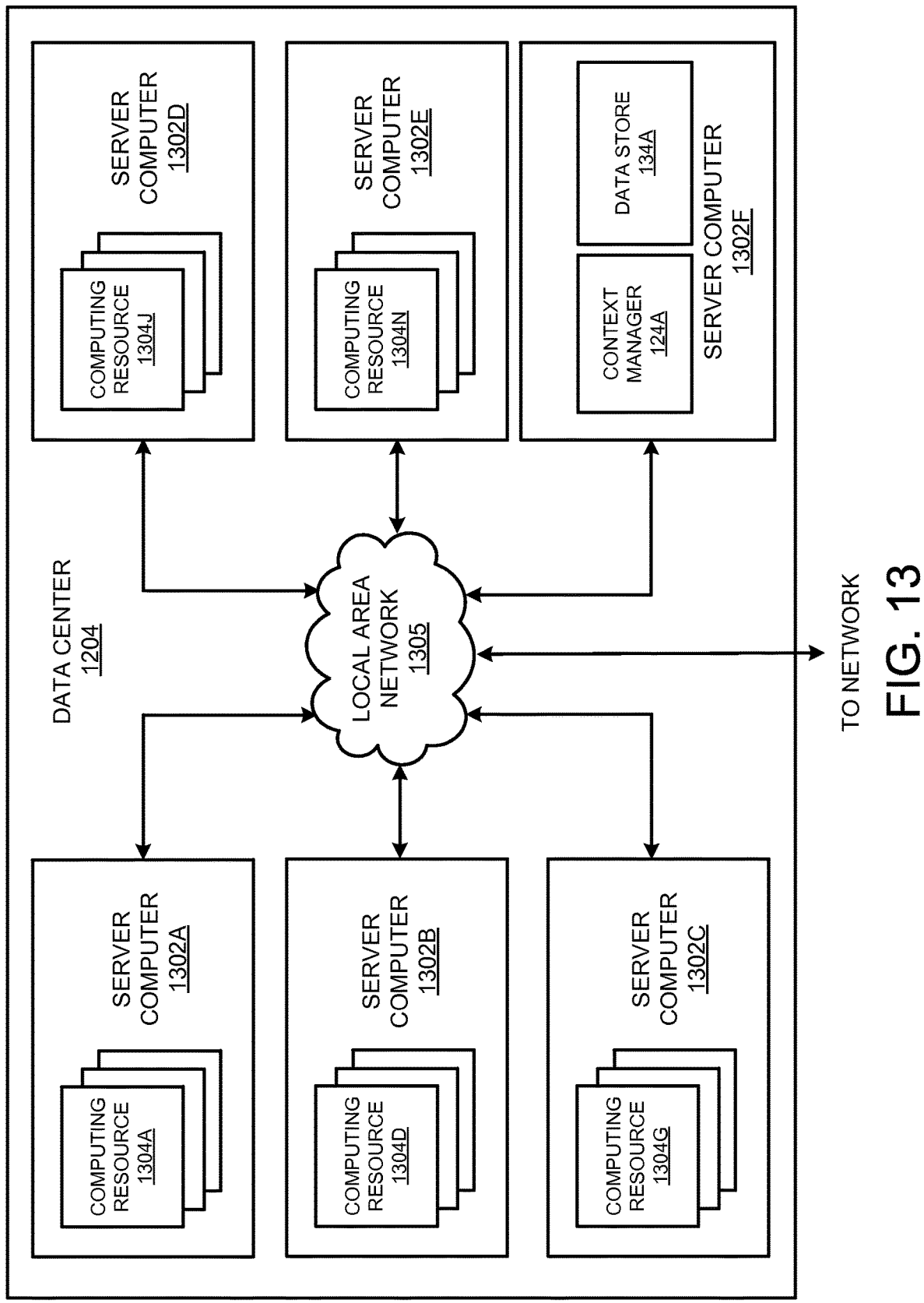
FIG. 13 is a computing system diagram that illustrates one configuration for a data center that implements aspects of a service provider network, including some or all of the concepts and technologies disclosed herein in which applications relevant to a current context provide data to a user.

FIG. 13 is a computing system diagram that illustrates one configuration for a data center 1204 that implements aspects of a service provider network 110, including some or all of the concepts and technologies disclosed herein in which a context sensitive framework is used to identify relevant applications to a current context and to provide data received from the relevant applications to a user. The example data center 1204 shown in FIG. 13 includes several server computers 1302A-1302F (which may be referred to herein singularly as "a server computer 1302" or in the plural as "the server computers 1302") for providing computing resources. The server computers 1302 may be standard tower or rack-mount server computers configured appropriately for providing the computing resources described herein. According to an example, the server computers 1302 are configured to execute the software products as described above.

In one example, some of the computing resources 1304 are virtual machine instances. As known in the art, a virtual machine instance is an instance of a software implementation of a machine (i.e. a computer) that executes programs like a physical machine. Each of the server computers 1302 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 1302, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 1204 shown in FIG. 13 also includes a server computer 1302F reserved for executing software components for managing the operation of the data center 1204, the server computers 1302, virtual machine instances, and other resources within the service provider network 110. The server computer 1302F might also execute the context manager 124A and include the data store 134A. Details regarding the operation of each of these components has been provided above. In this regard, it should be appreciated that while these components are illustrated as executing within service provider network 110, computing systems that are external to service provider network 110 might also be utilized to execute some or all of these components. Other configurations might also be utilized.

In the example data center 1204 shown in FIG. 13, an appropriate local area network ("LAN") 1305 is utilized to interconnect the server computers 1302A-1302E and the server computer 1302F. The LAN 1305 is also connected to the network 1230 illustrated in FIG. 12. It should be appreciated that the configuration and network topology illustrated in FIGS. 12 and 13 has been greatly simplified and that many more computing systems, networks and networking devices may be utilized to interconnect the various computing systems disclosed herein. Appropriate load balancing devices or software modules might also be utilized for balancing a load between each of the data centers 1204A-1204N, between each of the server computers 1302A-1302F in each data center 1204 and between virtual machine instances and other types of computing resources provided by the service provider network 110.

It should be appreciated that the data center 1204 described in FIG. 13 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 14:
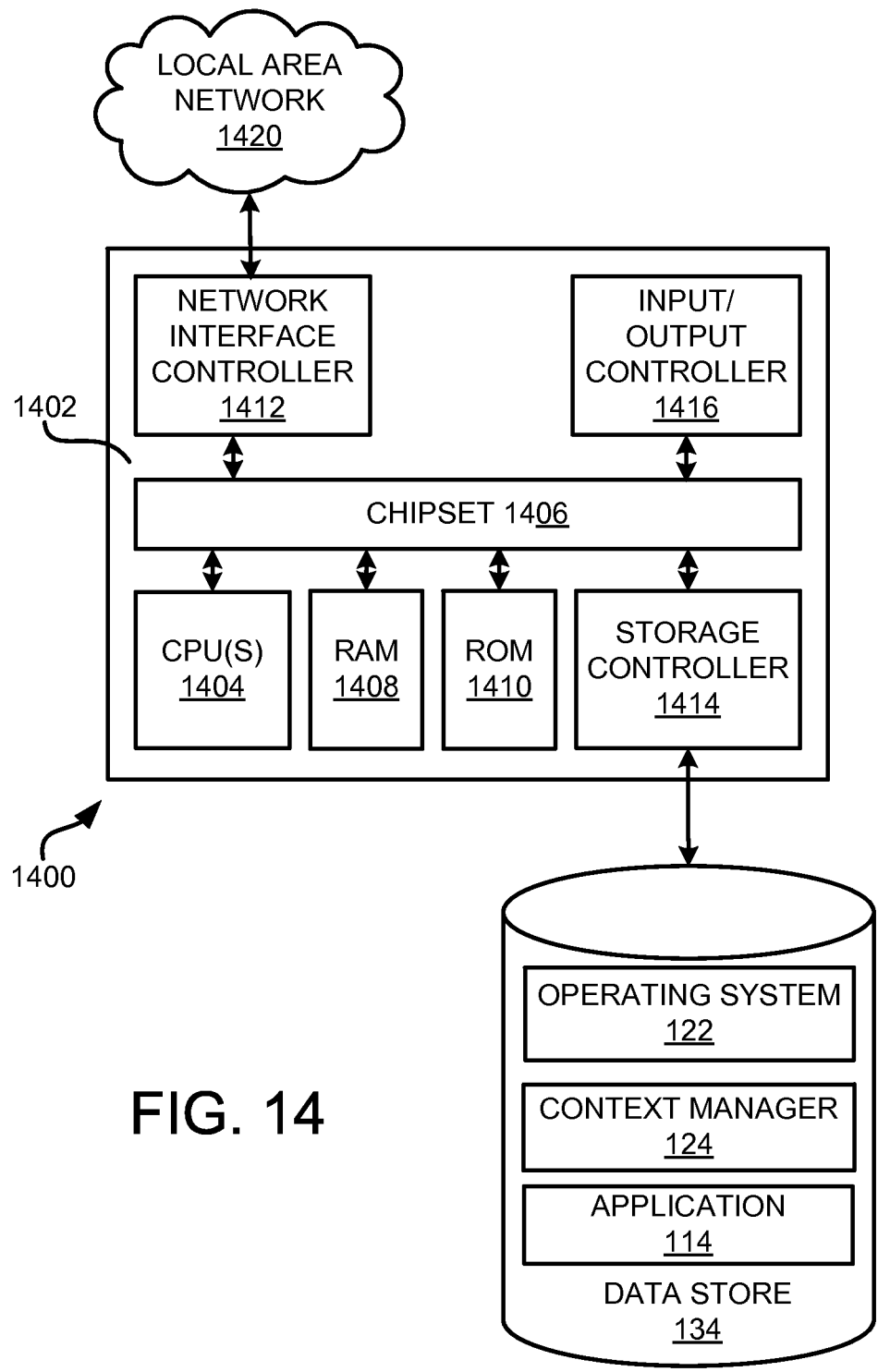
FIG. 14 is a computer architecture diagram showing one illustrative computer hardware architecture for implementing a computing device that might be utilized to implement aspects of the various examples presented herein.

FIG. 14 shows an example computer architecture for a computer 1400 capable of executing program components for using a context sensitive framework to provide application data to a user in the manner described above. The computer architecture shown in FIG. 14 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 14 may be utilized to execute software components for performing operations as described above. The computer architecture shown in FIG. 14 might also be utilized to implement a computing device 102, a computing device utilized in the contextual service 104, the application service 106 or the application execution service 108 or any other of the computing systems described herein.

The computer 1400 includes a baseboard 1402, or "motherboard," which is a printed circuit board to which a multitude of components or devices may be connected by way of a system bus or other electrical communication paths. In one illustrative example, one or more central processing units ("CPUs") 1404 operate in conjunction with a chipset 1406. The CPUs 1404 may be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1406 provides an interface between the CPUs 1404 and the remainder of the components and devices on the baseboard 1402. The chipset 1406 may provide an interface to a RAM 1408, used as the main memory in the computer 1400. The chipset 1406 may further provide an interface to a computer-readable storage medium such as a read-only memory ("ROM") 1410 or non-volatile RAM ("NVRAM") for storing basic routines that help to startup the computer 1400 and to transfer information between the various components and devices. The ROM 1410 or NVRAM may also store other software components necessary for the operation of the computer 1400 in accordance with the examples described herein.

The computer 1400 may operate in a networked environment using logical connections to remote computing devices and computer systems through a network, such as the local area network 1420. The chipset 1406 may include functionality for providing network connectivity through a network interface controller ("NIC") 1412, such as a gigabit Ethernet adapter. The NIC 1412 is capable of connecting the computer 1400 to other computing devices over the local area network 1420. It should be appreciated that multiple NICs 1412 may be present in the computer 1400, connecting the computer to other types of networks and remote computer systems.

The computer 1400 may be connected to a data store, such as the data store 134, that provides non-volatile storage for the computer. The data store 134 may store system programs, application programs, other program modules and data, which have been described in greater detail herein. The data store 134 may be connected to the computer 1400 through a storage controller 1414 connected to the chipset 1406. The data store 134 may consist of one or more physical storage units. The storage controller 1414 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1400 may store data on the data store 134 by transforming the physical state of the physical storage units to reflect the information being stored. The specific transformation of physical state may depend on various factors, in different implementations of this description. Examples of such factors may include, but are not limited to, the technology used to implement the physical storage units, whether the data store 134 is characterized as primary or secondary storage and the like.

For example, the computer 1400 may store information to the data store 134 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 may further read information from the data store 134 by detecting the physical states or characteristics of one or more particular locations within the physical storage units.

In addition to the data store 134 described above, the computer 1400 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1400.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The data store 134 may store an operating system 1430 utilized to control the operation of the computer 1400. According to one example, the operating system comprises the LINUX operating system. According to another example, the operating system comprises the WINDOWS® SERVER operating system from MICROSOFT Corporation. According to further examples, the operating system may comprise the UNIX operating system or the ANDROID operating system. It should be appreciated that other operating systems may also be utilized. The data store 134 may store other system or application programs and data utilized by the computer 1400, such as components that include the context manager 124, the application 114 and/or any of the other software components and data described above. The data store 134 might also store other programs and data not specifically identified herein.

In one example, the data store 134 or other computer-readable storage media is encoded with computer-executable instructions which, when loaded into the computer 1400, transform the computer from a general-purpose computing system into a special-purpose computer capable of implementing the examples described herein. These computer-executable instructions transform the computer 1400 by specifying how the CPUs 1404 transition between states, as described above. According to one example, the computer 1400 has access to computer-readable storage media storing computer-executable instructions which, when executed by the computer 1400, perform the various routines described above with regard to FIGS. 6-11. The computer 1400 might also include computer-readable storage media for performing any of the other computer-implemented operations described herein.

The computer 1400 may also include one or more input/output controllers 1416 for receiving and processing input from a number of input devices, such as a keyboard, a mouse, a touchpad, a touch screen, an electronic stylus, or other type of input device. Similarly, the input/output controller 1416 may provide output to a display, such as a computer monitor, a flat-panel display, a digital projector, a printer, a plotter, or other type of output device. It will be appreciated that the computer 1400 may not include all of the components shown in FIG. 14, may include other components that are not explicitly shown in FIG. 14, or may utilize an architecture completely different than that shown in FIG. 14.

Based on the foregoing, it should be appreciated that technologies for using a context sensitive framework to identify relevant applications to a current context and to provide data received from the relevant applications to a user have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A system, comprising:
one or more processors; and
one or more memories to store a set of instructions, which upon execution by the one or more processors, causes the one or more processors to perform operations comprising:
receiving context data associated with a mobile computing device;
identifying an application that is relevant to a context associated with the context data, wherein the application that is identified as relevant to the context is executed remote from the mobile computing device;
receiving, by a contextual service remote from the mobile computing device, application data from the application;
determining, by the contextual service remote from the mobile computing device, based at least in part on the context data, a part of the application data to provide to the mobile computing device; and
providing, by the contextual service remote from the mobile computing device, to the mobile computing device, the part of the application data.

2. The system of claim 1, wherein the mobile computing device displays the part of the application data within a user interface.

3. The system of claim 1, wherein an operation of the mobile computing device changes based, at least in part, on the part of the application data.

4. The system of claim 1, wherein the application is executed in response to a request by the contextual service.

5. The system of claim 1, wherein the operations further comprise causing the application to be installed on a remote computing device.

6. The system of claim 5, wherein the operations further comprise causing the application to be launched on the remote computing device.

7. The system of claim 1, wherein the operations further comprise providing analytics comprising usage data and revenue data.

8. The system of claim 1, wherein the application utilizes an application programming interface (API) to communicate with the contextual service.

9. The system of claim 8, wherein the application utilizes the API to communicate with another application.

10. A computer-implemented method, comprising:
receiving context data associated with a mobile computing device;
identifying an application that is relevant to a context associated with the context data, wherein the application that is identified as relevant to the context is executed remote from the mobile computing device;
receiving, by a contextual service remote from the mobile computing device, application data from the application;
determining, by the contextual service remote from the mobile computing device, based at least in part on the context data, a part of the application data to provide to the mobile computing device; and
providing, by the contextual service remote from the mobile computing device, to the mobile computing device, the part of the application data.

11. The computer-implemented method of claim 10, further comprising causing an application execution service to execute the application.

12. The computer-implemented method of claim 10, further comprising causing the application to be installed on a remote computing device.

13. The computer-implemented method of claim 10, wherein the application utilizes an application programming interface (API) to communicate with the contextual service.

14. One or more non-transitory computer readable storage media having stored thereon instructions that, upon execution by one or more computer processors, cause the one or more computer processors to perform operations comprising:
receiving context data associated with a mobile computing device;
identifying an application that is relevant to a context associated with the context data, wherein the application that is identified as relevant to the context is executed remote from the mobile computing device;
receiving, by a contextual service remote from the mobile computing device, application data from the application;
determining, by the contextual service remote from the mobile computing device, based at least in part on the context data, a part of the application data to provide to the mobile computing device; and
providing, by the contextual service remote from the mobile computing device, to the mobile computing device, the part of the application data.

15. The one or more non-transitory computer readable storage media of claim 14, wherein the operations further comprise causing an application execution service to execute the application.

16. The one or more non-transitory computer readable storage media of claim 14, wherein the operations further comprise causing application to be installed on a remote computing device.

17. The one or more non-transitory computer readable storage media of claim 14, wherein the application utilizes an application programming interface (API) to communicate with the contextual service.

* * * * *